United States Patent
Miyauchi

(10) Patent No.: US 7,230,398 B2
(45) Date of Patent: Jun. 12, 2007

(54) BRUSHLESS MOTOR CONTROL APPARATUS AND BRUSHLESS MOTOR CONTROL METHOD

(75) Inventor: Masato Miyauchi, Utsunomiya (JP)

(73) Assignee: Honda Motor Co., Ltd., Tokyo (JP)

(*) Notice: Subject to any disclaimer, the term of this patent is extended or adjusted under 35 U.S.C. 154(b) by 136 days.

(21) Appl. No.: 10/986,957

(22) Filed: Nov. 15, 2004

(65) Prior Publication Data
US 2005/0127857 A1 Jun. 16, 2005

(30) Foreign Application Priority Data
Nov. 17, 2003 (JP) .............................. 2003-386569

(51) Int. Cl.
*H02P 1/18* (2006.01)
(52) U.S. Cl. .................... 318/254; 318/138; 318/439
(58) Field of Classification Search ................ 318/254, 318/138, 439
See application file for complete search history.

(56) References Cited

U.S. PATENT DOCUMENTS

| | | | | |
|---|---|---|---|---|
| 3,988,652 A | * | 10/1976 | Endo et al. ................. | 318/138 |
| 5,001,405 A | * | 3/1991 | Cassat ........................ | 318/254 |
| 5,245,256 A | * | 9/1993 | Cassat et al. ............... | 318/254 |
| 5,565,752 A | * | 10/1996 | Jansen et al. ............... | 318/807 |
| 5,569,990 A | * | 10/1996 | Dunfield ..................... | 318/254 |
| 2002/0149335 A1 | * | 10/2002 | Imai et al. .................. | 318/494 |

FOREIGN PATENT DOCUMENTS

| JP | 2002-171798 | 6/2002 |
|---|---|---|
| JP | 2002-320398 | 10/2002 |

* cited by examiner

*Primary Examiner*—Rina Duda
(74) *Attorney, Agent, or Firm*—Arent Fox LLP

(57) ABSTRACT

A brushless motor control apparatus of a brushless motor which includes a permanent magnet type rotor and a stator, and which applies a harmonic voltage to a winding of the stator and measures the position of the rotor from the motor electrical current which is generated by the high frequency voltage, including an electrical current command control device which, in a magnetic pole discrimination procedure which discriminates the orientation of a magnetic pole of the rotor, varies a field electrical current command value based upon the position of the rotor.

2 Claims, 9 Drawing Sheets

BRUSHLESS MOTOR CONTROL APPARATUS AND BRUSHLESS MOTOR CONTROL METHOD

BACKGROUND OF THE INVENTION

1. Field of the Invention

The present invention relates to a brushless motor control apparatus and to a brushless motor control method for controlling a brushless motor which includes a rotor of the permanent magnet type.

Priority is claimed on Japanese Patent Application No. 2003-386569, filed Nov. 17, 2003, the content of which is incorporated herein by reference.

2. Description of the Related Art

In the past, for control of a brushless motor, as a method of measuring the rotor angle with good accuracy without employing any position measurement sensor for performing measurement of the position of the rotor, there has, for example, been a method of doing so by applying, to a voltage command value for controlling the motor rotation, a higher harmonic voltage such that the rotor is not additionally rotated thereby. In concrete terms, there is a per se known method of, along with measuring the rotor angle which gives the position of the rotor from the motor electrical current that flows in each phase of the motor due to the harmonic voltage which has been applied to the voltage command value, also applying a voltage for magnetic pole detection in the direction of the magnetic field and thereby discriminating the orientation of the magnetic poles of the rotor. In this case, for discriminating the orientation of the magnetic poles of the rotor, since, when an electrical current flows in the direction of the magnetic field and has generated a magnetic field, the state of the motor electrical current which flows in each phase of the motor changes with the state of saturation when the direction of the magnetic field which is generated by the electrical current and the direction of the magnetic field which is generated by the magnet are the same, and with the state of non saturation when the direction of the magnetic field which is generated by the electrical current and the direction of the magnetic field which is generated by the magnet being opposite, accordingly it is possible to decide upon the orientation of the magnetic poles of the rotor by discriminating these changes (for example, refer to Unexamined Japanese Patent Application, First Publication Nos. 2002-171798 and 2002-320398).

Thus, with a control device for a brushless motor as described in JP 2002-320398, in order to cause the motor to rotate with the desired torque or speed of rotation, control is performed so as to bring the fed-back motor electrical current (the actual electrical current) to approach to the electrical current command value for controlling the rotation of the motor. In concrete terms, as shown in the following Equation (1) and Equation (2), voltage command values Vd' and Vq' in order to control the rotation of the motor by PI (proportional integral) control are calculated, based upon the differences Iderr and Iqerr between the electrical current command value and the motor electrical current (the actual electrical current).

$$Vd' = Kp(Iderr) + Ki \int (Iderr) dt \quad (1)$$

$$Vq' = Kp(Iqerr) + Ki \int (Iqerr) dt \quad (2)$$

Moreover, in Equations (1) and (2), Kp is the proportional gain, and Ki is the integral gain.

However, with this type of control device, while it is possible to rotate the motor at the desired torque or rotational speed, when starting driving of the motor for the first time (upon initial starting), there is the problem that it takes some time before the orientation of the magnetic poles of the rotor is discriminated by the magnetic pole discrimination procedure. In concrete terms, when PI control is performed for calculating the voltage command value Vq', the time constant until the voltage command value Vq' is calculated is long, and the peak electrical current in both the positive and negative directions of the motor electrical current (the actual electrical current) is not stable in the short term. Due to this, the magnetic field which is generated by this electrical current is also not stable, and accordingly it takes a relatively long time before it is possible to discriminate the orientation of the magnetic poles of the rotor, since it is not possible to perform the magnetic pole discrimination procedure accurately until the magnetic field has stabilized.

SUMMARY OF THE INVENTION

The present invention has been conceived in the light of the above described problems, and its objective is to provide a brushless motor control apparatus and method which, when the motor initially starts, are capable of executing a stabilized magnetic pole discrimination procedure in a short time period and moreover with good efficiency, and which are capable of measuring the position of the rotor accurately.

In order to solve the above described problems, the present invention provides a brushless motor control apparatus for a brushless motor which includes a permanent magnet type rotor and a stator, which applies a harmonic voltage to a winding of the stator and measures the position of the rotor from the motor electrical current which is generated by the high frequency voltage, including an electrical current command control device which, in a magnetic pole discrimination procedure which discriminates the orientation of a magnetic pole of the rotor, varies a field electrical current command value based upon the position of the rotor.

With the brushless motor control apparatus having the above described structure, by the electrical current command control means varying the field electrical current command value based upon the position of the rotor during the magnetic pole discrimination procedure for discriminating the orientation of the magnetic poles of the rotor, it is possible to reduce the width of variation of the actual electrical current of the motor while maintaining the performance for magnetic pole discrimination constant over the entire gamut of the rotor angle. Accordingly, demagnetization by the magnetic pole discrimination procedure when starting the motor is suppressed, and furthermore the magnetic pole discrimination procedure is executed in a short time period and moreover with good efficiency while ensuring a stabilized performance for magnetic pole discrimination, so that it is possible to implement a brushless motor control apparatus which is capable of measuring the position of the rotor in an accurate manner.

With the above described brushless motor control apparatus, it is desirable for the electrical current command control device to be so structured as to select a field electrical current command value according to the rotor angle which specifies the position of the rotor from among a set of field electrical current command values which have been set in advance for each of a set of predetermined angular ranges.

With the brushless motor control apparatus having the above described structure, by selecting the field electrical current command value which has been set in advance for each predetermined angle range according to the rotor angle, it is possible to vary the field electrical current command value based upon the position of the rotor in an easy manner with a simple structure. Accordingly, along with it being possible to stabilize the performance for magnetic pole discrimination over the entire range of rotor angle, it is also possible to suppress the demagnetization action.

Furthermore, the present invention provides a control method for a brushless motor which includes a permanent magnet type rotor and a stator, including the steps of: applying a harmonic voltage to a winding of the stator; measuring the position of the rotor from the motor electrical current which is generated by the high frequency voltage; and varying a field electrical current command value based upon the position of the rotor along with discriminating the orientation of a magnetic pole of the rotor.

According to the above described brushless motor control method, by the electrical current command control device varying the field electrical current command value based upon the position of the rotor in the step of magnetic pole discrimination for discriminating the orientation of the magnetic poles of the rotor, it is possible to reduce the width of variation of the actual electrical current of the motor while maintaining the performance for magnetic pole discrimination constant over the entire gamut of the rotor angle. Accordingly, demagnetization by the magnetic pole discrimination procedure when starting the motor is suppressed, and furthermore the magnetic pole discrimination procedure is executed in a short time period and moreover with good efficiency while ensuring a stabilized performance for magnetic pole discrimination, so that it is possible to implement a brushless motor control method which is capable of measuring the position of the rotor in an accurate manner.

With the above described brushless motor control method, it is desirable for there to be further included a step of selecting a field electrical current command value according to the rotor angle which specifies the position of the rotor from among a set of field electrical current command values which have been set in advance for each of a set of predetermined angular ranges.

According to the above described brushless motor control method, by selecting the field electrical current command value which has been set in advance for each predetermined angle range according to the rotor angle, it is possible to vary the field electrical current command value based upon the position of the rotor in an easy manner with a simple structure. Accordingly, along with it being possible to stabilize the performance for magnetic pole discrimination over the entire range of rotor angle, it is also possible to suppress the demagnetization action.

DESCRIPTION OF THE PREFERRED EMBODIMENTS

In the following, a preferred embodiment of the present invention will be explained with reference to the figures.

-Theory of Measurement of the Rotor Position-

Figure 1A:
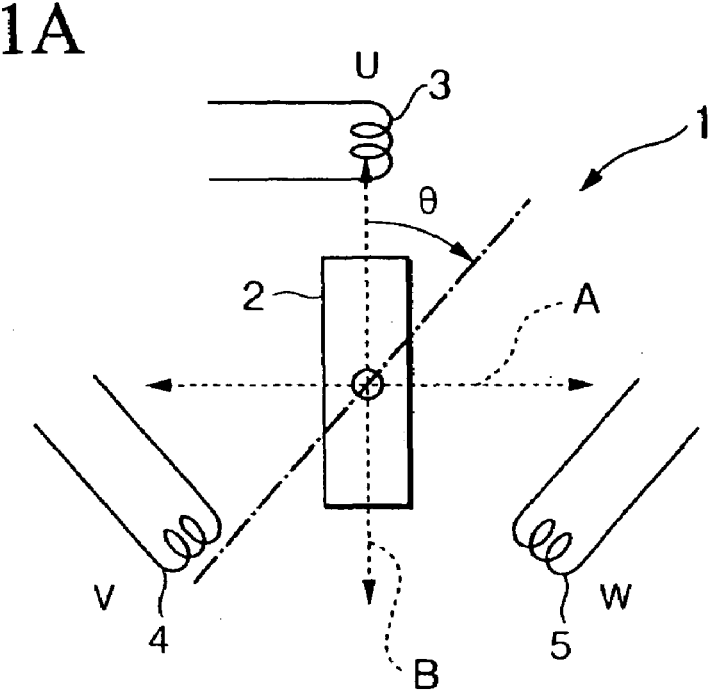
FIGS. 1A and 1B are figures showing a structural view of, and an equivalent circuit for, a DC brushless motor which is controlled by a brushless motor control apparatus according to the preferred embodiment of the present invention.
Figure 1B:
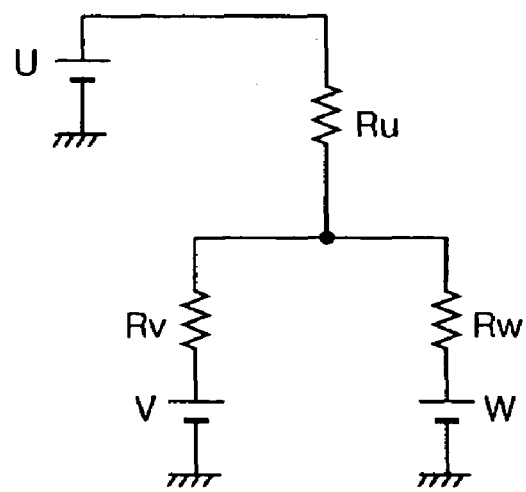

First, before explaining the preferred embodiment of the present invention, the basic concept of the present invention will be explained with reference to FIGS. 1A and 1B. FIGS. 1A and 1B show a structural view and an equivalent circuit of a DC brushless motor. With regard to limitations of the typography, it should be understood that although, since the formulas in the following explanation have been inserted as images, it is possible, when required, to show caret symbols "^" positioned over the appropriate characters in those formulas, on the other hand, in the text, it is not practicable to position caret symbols "^" over the characters, and accordingly the expedient has been adopted of putting the caret symbols "^" after the applicable characters, on their right sides. In concrete terms, if for example the character over which it is required to add a caret symbol "^" is a "θ", then this will be expressed as "θ^"in the text.

As shown in FIG. 1A, in the case in which the brushless motor control apparatus of an embodiment of the present invention controls a rotor 2 of the salient pole type in a DC brushless motor, the magnetic resistances of the gaps between the rotor 2 and each of the U, V, and W armatures 3, 4, and 5 change periodically; and these changes go through two cycles every time the rotor 2 rotates once, in other words they go through one cycle every time the rotor 2 executes half a rotation. The magnetic resistances become maximum when the rotor comes to be in the position A in the figure, while they become minimum when the rotor 2 comes to be in the position B in the figure.

FIG. 1B is a figure showing schematically the magnetic circuit of FIG. 1A; and, if it is supposed that the average value through one cycle of the magnetic resistance is "0.5", then the magnetic resistances Ru, Rv, and Rw for each of the U, V, and W-phases are given by the following Equations (3) through (5):

$$Ru = 1 - \cos 2\theta \tag{3}$$

$$Rv = 1 - \cos\left(2\theta + \frac{2}{3}\pi\right) \tag{4}$$

$$Rw = 1 - \cos\left(2\theta - \frac{2}{3}\pi\right) \tag{5}$$

At this time, the magnetic resistance Rgu of the gap as seen from the U-phase may be obtained by the Equation (6) below:

$$Rgu = Ru + \frac{Rv \cdot Rw}{Rv + Rw} \tag{6}$$

$$= 1 + \cos 2\theta + \frac{1 + \cos\left(2\theta - \frac{2}{3}\pi\right) + \cos\left(2\theta + \frac{2}{3}\pi\right) + \cos\left(2\theta - \frac{2}{3}\pi\right) \cdot \cos\left(2\theta + \frac{2}{3}\pi\right)}{2 + \cos\left(2\theta - \frac{2}{3}\pi\right) + \cos\left(2\theta + \frac{2}{3}\pi\right)}$$

$$= 1 + \cos 2\theta + \frac{1 - \cos 2\theta + \frac{1}{2}\left(\cos 4\theta + \cos\frac{2}{3}\pi\right)}{2 - \cos 2\theta}$$

$$= \frac{8 - \cos\frac{2}{3}\pi}{4 - 2\cos 2\theta}$$

Due to this, if it is supposed that the U-phase is a unit winding, then the self-inductance Lu of the U-phase may be obtained by the following Equation (7):

$$Lu = \frac{1}{Rgu} = \frac{4 - 2\cos 2\theta}{8 - \cos\frac{2}{3}\pi} \tag{7}$$

Furthermore, due to the structure of the magnetic circuit, the mutual inductance Muw between the U-phase and the W-phase and the Mutual inductance Muv between the U-phase and the V-phase may respectively be obtained by the following Equations (8) and (9):

$$Muw = -\frac{Rw}{Rv + Rw}Lu = -\frac{2 + 2\cos\left(2\theta + \frac{2}{3}\pi\right)}{8 - \cos\frac{2}{3}\pi} \tag{8}$$

$$Muv = -\frac{Rv}{Rv + Rw}Lu = -\frac{2 + 2\cos\left(2\theta - \frac{2}{3}\pi\right)}{8 - \cos\frac{2}{3}\pi} \tag{9}$$

For the V-phase and the W-phase as well, it is possible to obtain the self inductance and the mutual inductances in the same manner, and thus the voltage equations for a DC brushless motor having a salient pole structure may be expressed by the following Equations (10), where "l" is the direct current component of the self inductance of each phase, Δl is the amount of fluctuation of "l", and "m" is the direct current components of the mutual inductances between the various phases:

$$\begin{bmatrix} Vu \\ Vv \\ Vw \end{bmatrix} = r\begin{bmatrix} Iu \\ Iv \\ Iw \end{bmatrix} + \frac{d}{dt}\begin{bmatrix} l - \Delta l\cos 2\theta & m - \Delta l\cos\left(2\theta - \frac{2}{3}\pi\right) & m - \Delta l\cos\left(2\theta + \frac{2}{3}\pi\right) \\ m - \Delta l\cos\left(2\theta - \frac{2}{3}\pi\right) & l - \Delta l\cos\left(2\theta + \frac{2}{3}\pi\right) & m - \Delta l\cos 2\theta \\ m - \Delta l\cos\left(2\theta + \frac{2}{3}\pi\right) & m - \Delta l\cos 2\theta & l - \Delta l\cos\left(2\theta - \frac{2}{3}\pi\right) \end{bmatrix}\begin{bmatrix} Iu \\ Iv \\ Iw \end{bmatrix} + \omega Ke\begin{bmatrix} \sin\theta \\ \sin\left(\theta - \frac{2}{3}\pi\right) \\ \sin\left(\theta - \frac{4}{3}\pi\right) \end{bmatrix} \tag{10}$$

Here, Vu, Vv, and Vw are the respective voltages which are applied to the armatures of the U-phase, the V-phase, and the W-phase; Iu, Iv, and Iw are the respective electrical currents which flow in the armatures of the U-phase, the V-phase, and the W-phase; r is the electrical resistance of the armatures of the U-phase, the V-phase, and the W-phase; ω is the electrical angular speed of the rotor 2; and Ke is the induced voltage constant.

Furthermore if the electrical angular speed ω is almost "0", the influences due to changes of the induced voltage and the angular speed of the rotor 2 are small, and the voltage drop due to the resistance r is at a level which can be ignored, then the aforementioned Equations (10) may be approximated by the following Equations (11):

$$\begin{bmatrix} Vu \\ Vv \\ Vw \end{bmatrix} \approx \begin{bmatrix} l - \Delta l \cos 2\theta & m - \Delta l \cos\left(2\theta - \frac{2}{3}\pi\right) & m - \Delta l \cos\left(2\theta + \frac{2}{3}\pi\right) \\ m - \Delta l \cos\left(2\theta - \frac{2}{3}\pi\right) & l - \Delta l \cos\left(2\theta + \frac{2}{3}\pi\right) & m\, \Delta l \cos 2\theta \\ m - \Delta l \cos\left(2\theta + \frac{2}{3}\pi\right) & m - \Delta l \cos 2\theta & l - \Delta l \cos\left(2\theta - \frac{2}{3}\pi\right) \end{bmatrix} \frac{d}{dt}\begin{bmatrix} Iu \\ Iv \\ Iw \end{bmatrix} \quad (11)$$

Here, when the above described Equations (11) are transformed into equations for the electrical currents and voltages between the various phases, then the following Equations (12) are obtained;

$$\begin{bmatrix} 1 & -1 & 0 \\ 1 & -1 & 1 \end{bmatrix}\begin{bmatrix} Vu \\ Vv \\ Vw \end{bmatrix} = \begin{bmatrix} Vu - Vv \\ Vw - Vv \end{bmatrix} \quad (12)$$

$$\approx \begin{bmatrix} 1 & -1 & 0 \\ 0 & -1 & 1 \end{bmatrix}\begin{bmatrix} l - \Delta l \cos 2\theta & m - \Delta l \cos\left(2\theta - \frac{2}{3}\pi\right) & m - \Delta l \cos\left(2\theta + \frac{2}{3}\pi\right) \\ m - \Delta l \cos\left(2\theta - \frac{2}{3}\pi\right) & l - \Delta l \cos\left(2\theta + \frac{2}{3}\pi\right) & m - \Delta l \cos 2\theta \\ m - \Delta l \cos\left(2\theta + \frac{2}{3}\pi\right) & m - \Delta l \cos 2\theta & l - \Delta l \cos\left(2\theta - \frac{2}{3}\pi\right) \end{bmatrix} \frac{d}{dt}\begin{bmatrix} Iu \\ Iv \\ Iw \end{bmatrix}$$

$$= \begin{bmatrix} l - m - \Delta l\{\cos 2\theta - \cos\left(2\theta - \frac{2}{3}\pi\right)\} & -l + m - \Delta l\{\cos\left(2\theta - \frac{2}{3}\pi\right) - \cos\left(2\theta - \frac{2}{3}\pi\right)\} & \Delta l\{\cos 2\theta - \cos\left(2\theta + \frac{2}{3}\pi\right)\} \\ \Delta l\{\cos\left(2\theta - \frac{2}{3}\pi\right) - \cos\left(2\theta + \frac{2}{3}\pi\right)\} & -l + m - \Delta l\{\cos 2\theta - \cos\left(2\theta + \frac{2}{3}\pi\right)\} & l - m + \Delta l\{\cos 2\theta - \cos\left(2\theta - \frac{2}{3}\pi\right)\} \end{bmatrix}$$

$$\begin{bmatrix} 1 & 0 \\ -1 & -1 \\ 0 & 1 \end{bmatrix}\frac{d}{dt}\begin{bmatrix} Iu \\ Iw \end{bmatrix}$$

$$= \begin{bmatrix} 2(l - m) - \Delta l\{\cos 2\theta - \cos\left(2\theta - \frac{2}{3}\pi\right) + \cos\left(2\theta + \frac{2}{3}\pi\right)\} & l - m + \Delta l\{\cos 2\theta + \cos\left(2\theta - \frac{2}{3}\pi\right) - 2\cos\left(2\theta + \frac{2}{3}\pi\right)\} \\ l - m + \Delta l\{\cos 2\theta + \cos\left(2\theta - \frac{2}{3}\pi\right) - 2\cos\left(2\theta + \frac{2}{3}\pi\right)\} & 2(l - m) + \Delta l\{2\cos 2\theta - \cos\left(2\theta - \frac{2}{3}\pi\right) - \cos\left(2\theta + \frac{2}{3}\pi\right)\} \end{bmatrix} \frac{d}{dt}\begin{bmatrix} Iu \\ Iw \end{bmatrix}$$

$$= \begin{bmatrix} 2(l - m) + 3\Delta l \cos\left(2\theta - \frac{2}{3}\pi\right) & l - m - 3\Delta l \cos\left(2\theta + \frac{2}{3}\pi\right) \\ l - m - 3\Delta l \cos\left(2\theta + \frac{2}{3}\pi\right) & 2(l - m) + 3\Delta l \cos 2\theta \end{bmatrix} \frac{d}{dt}\begin{bmatrix} Iu \\ Iw \end{bmatrix}$$

Furthermore, since the inductance matrix of the above described Equations (12) is non-singular, it is possible to transform the above described Equations (12) into the form of the Equations (13) and (14) below:

$$\begin{bmatrix} \frac{d}{dt} Iu \\ \frac{d}{dt} Iw \end{bmatrix} = K \begin{bmatrix} 2(l - m) + 3\Delta l \cos 2\theta & -l + m + 3\Delta l \cos\left(2\theta + \frac{2}{3}\pi\right) \\ -l + m + 3\Delta l \cos\left(2\theta + \frac{2}{3}\pi\right) & 2(l - m) + 3\Delta l \cos\left(2\theta - \frac{2}{3}\pi\right) \end{bmatrix} \begin{bmatrix} Vu - Vv \\ Vw - Vv \end{bmatrix} \quad (13)$$

$$K = \frac{1}{\{2(l - m) + 3\Delta l \cos\left(2\theta - \frac{2}{3}\pi\right)\} \times \{2(l - m) + 3\Delta l \cos 2\theta\} - \{l - m - 3\Delta l \cos\left(2\theta + \frac{2}{3}\pi\right)\}^2} \quad (14)$$

Furthermore, if a DC brushless motor is being handled in the so-called dq coordinate system, using a presumed value for the rotor angle of $\hat{\theta}$, when the 3-phase/dq transformation given by the Equations (15) and (16) is applied to the above described Equation (13), then, if the presumed value ($\hat{\theta}$) of the rotor angle is equal to its actual value ($\theta$) (i.e., if $\hat{\theta}=\theta$), the Equation (17) following is obtained:

$$\begin{bmatrix} \hat{V}d \\ \hat{V}q \end{bmatrix} = \frac{2}{3} \begin{bmatrix} \sin\hat{\theta} & \sin\left(\hat{\theta}-\frac{2}{3}\pi\right) & \sin\left(\hat{\theta}-\frac{4}{3}\pi\right) \\ \cos\hat{\theta} & \cos\left(\hat{\theta}-\frac{2}{3}\pi\right) & \cos\left(\hat{\theta}-\frac{4}{3}\pi\right) \end{bmatrix} \begin{bmatrix} Vu \\ Vv \\ Vw \end{bmatrix} \quad (15)$$

$$\begin{bmatrix} \hat{I}d \\ \hat{I}q \end{bmatrix} = \frac{2}{3} \begin{bmatrix} \sin\hat{\theta} & \sin\left(\hat{\theta}-\frac{2}{3}\pi\right) & \sin\left(\hat{\theta}-\frac{4}{3}\pi\right) \\ \cos\hat{\theta} & \cos\left(\hat{\theta}-\frac{2}{3}\pi\right) & \cos\left(\hat{\theta}-\frac{4}{3}\pi\right) \end{bmatrix} \begin{bmatrix} Iu \\ Iv \\ Iw \end{bmatrix} \quad (16)$$

$$\begin{bmatrix} \hat{V}d \\ \hat{V}q \end{bmatrix} = \begin{bmatrix} r+\frac{d}{dt}Ld & -\omega Lq \\ \omega Lq & r+\frac{d}{dt}Lq \end{bmatrix} \begin{bmatrix} \hat{I}d \\ \hat{I}q \end{bmatrix} + \begin{bmatrix} \omega Ke \\ 0 \end{bmatrix} \quad (17)$$

$$Ld = l - m + \frac{3}{2}\Delta l \quad (18)$$

$$Lq = l - m - \frac{3}{2}\Delta l \quad (19)$$

Here, if the rotor angle ($\theta$) in the above described Equation (13) is a presumed value which is deviated from the actual value of the rotor angle by just ($\theta e$), then the relationship given by the following Equations (20) and (21) holds between the $\hat{I}d$, $\hat{I}q$, $\hat{V}d$, and $\hat{V}q$ which have been 3-phase/dq transformed using the presumed value, and the Id, Iq, Vd, and Vq which have been 3-phase/dq transformed using the actual value of rotor angle:

$$\begin{bmatrix} \hat{I}d \\ \hat{I}q \end{bmatrix} = \begin{bmatrix} \cos\theta e & -\sin\theta e \\ \sin\theta e & \cos\theta e \end{bmatrix} \begin{bmatrix} Id \\ Iq \end{bmatrix} \quad (20)$$

$$\begin{bmatrix} \hat{V}d \\ \hat{V}q \end{bmatrix} = \begin{bmatrix} \cos\theta e & -\sin\theta e \\ \sin\theta e & \cos\theta e \end{bmatrix} \begin{bmatrix} Vd \\ Vq \end{bmatrix} \quad (21)$$

Here, the phase difference between the actual value of the rotor angle and its presumed value is taken as $\theta e$. Accordingly, the relationship given by Equation (22) below is derived:

$$\begin{aligned}
\frac{d}{dt}\begin{bmatrix} \hat{I}d \\ \hat{I}q \end{bmatrix} &= \begin{bmatrix} \cos\theta e & -\sin\theta e \\ \sin\theta e & \cos\theta e \end{bmatrix} \frac{d}{dt}\begin{bmatrix} Id \\ Iq \end{bmatrix} \\
&= \begin{bmatrix} \cos\theta e & -\sin\theta e \\ \sin\theta e & \cos\theta e \end{bmatrix} \begin{bmatrix} -\frac{r}{Ld} & \omega\frac{Lq}{Ld} \\ -\omega\frac{Ld}{Lq} & -\frac{r}{Lq} \end{bmatrix} \\
&\quad \begin{bmatrix} \cos\theta e & \sin\theta e \\ -\sin\theta e & \cos\theta e \end{bmatrix} \begin{bmatrix} \hat{I}d \\ \hat{I}q \end{bmatrix} + \\
&\quad \begin{bmatrix} \cos\theta e & -\sin\theta e \\ \sin\theta e & \cos\theta e \end{bmatrix} \begin{bmatrix} \frac{1}{Ld} & 0 \\ 0 & \frac{1}{Lq} \end{bmatrix} \\
&\quad \left\{ \begin{bmatrix} \cos\theta e & \sin\theta e \\ -\sin\theta e & \cos\theta e \end{bmatrix} \begin{bmatrix} \hat{V}d \\ \hat{V}q \end{bmatrix} - \begin{bmatrix} \omega Ke \\ 0 \end{bmatrix} \right\}
\end{aligned} \quad (22)$$

In the same manner as in the case of the above described Equation (10), if the electrical angular speed $\omega$ of almost "0", the influence due to the induction voltage or change of the angle of the rotor 2 is small, and it is possible to ignore the voltage drop due to the resistance r, then it is possible to approximate the above described Equation (22) by the following Equation (23):

$$\begin{aligned}
\frac{d}{dt}\begin{bmatrix} \hat{I}d \\ \hat{I}q \end{bmatrix} &= \begin{bmatrix} \frac{1}{Ld}\cos^2\theta e + \frac{1}{Lq}\sin^2\theta e & \left(\frac{1}{Ld}-\frac{1}{Lq}\right)\cos\theta e \sin\theta e \\ \left(\frac{1}{Ld}-\frac{1}{Lq}\right)\cos\theta e \sin\theta e & \frac{1}{Ld}\sin^2\theta e + \frac{1}{Lq}\cos^2\theta e \end{bmatrix} \begin{bmatrix} \hat{V}d \\ \hat{V}q \end{bmatrix} \\
&= \begin{bmatrix} \frac{1}{Ld}\frac{1+\cos 2\theta e}{2} + \frac{1}{Lq}\frac{1-\cos 2\theta e}{2} & \left(\frac{1}{Ld}-\frac{1}{Lq}\right)\frac{\sin 2\theta e}{2} \\ \left(\frac{1}{Ld}-\frac{1}{Lq}\right)\frac{\sin 2\theta e}{2} & \frac{1}{Ld}\frac{1-\cos 2\theta e}{2} + \frac{1}{Lq}\frac{1+\cos 2\theta e}{2} \end{bmatrix} \begin{bmatrix} \hat{V}d \\ \hat{V}q \end{bmatrix} \\
&= \frac{1}{2}\begin{bmatrix} \left(\frac{1}{Ld}+\frac{1}{Lq}\right)+\left(\frac{1}{Ld}-\frac{1}{Lq}\right)\cos 2\theta e & \left(\frac{1}{Ld}-\frac{1}{Lq}\right)\sin 2\theta e \\ \left(\frac{1}{Ld}-\frac{1}{Lq}\right)\sin 2\theta e & \left(\frac{1}{Ld}+\frac{1}{Lq}\right)+\left(\frac{1}{Ld}-\frac{1}{Lq}\right)\cos 2\theta e \end{bmatrix} \begin{bmatrix} \hat{V}d \\ \hat{V}q \end{bmatrix} \\
&\equiv \begin{bmatrix} L_0 + L_1\cos 2\theta e & L_1\sin 2\theta e \\ L_1\sin 2\theta e & L_0 - L_1\cos 2\theta e \end{bmatrix} \begin{bmatrix} \hat{V}d \\ \hat{V}q \end{bmatrix}
\end{aligned} \quad (23)$$

When the differential interval (dt) in the above described Equation (23) is taken as the length ($\Delta t$) of the control cycle, and, in some control cycle, the 3-phase/dq transformation procedure based upon the presumed value ($\theta\hat{}$) of the rotor angle of the motor is performed, then, if the d-axis voltage and the q-axis voltage in the control cycle are taken as {Vd(1), Vq(1)}, and the changed values of the d-axis actual electrical current and of the q-axis actual electrical current are taken as {$\Delta$Id(1), $\Delta$Iq(1)}, then the above described Equation (23) may be expressed as the Equation (24) below:

$$\begin{bmatrix} L_0 + L_1\cos 2\theta e & L_1 \sin 2\theta e \\ L_1 \sin 2\theta e & L_0 - L_1 \cos 2\theta e \end{bmatrix} \begin{bmatrix} \hat{V}d(1) \\ \hat{V}q(1) \end{bmatrix} = \begin{bmatrix} \frac{\Delta \hat{I}d(1)}{\Delta t} \\ \frac{\Delta \hat{I}q(1)}{\Delta t} \end{bmatrix} \quad (24)$$

In the same manner, when the d-axis voltage and the q-axis voltage in the next control cycle are taken as {Vd(2), Vq(2)}, and the changed values of the d-axis actual electrical current and of the q-axis actual electrical current are taken as {$\Delta$Id(2), $\Delta$Iq(2)}, then the above described Equation (23) may be expressed as the Equation (25) below:

$$\begin{bmatrix} L_0 + L_1\cos 2\theta e & L_1 \sin 2\theta e \\ L_1 \sin 2\theta e & L_0 - L_1 \cos 2\theta e \end{bmatrix} \begin{bmatrix} \hat{V}d(2) \\ \hat{V}q(2) \end{bmatrix} = \begin{bmatrix} \frac{\Delta \hat{I}d(2)}{\Delta t} \\ \frac{\Delta \hat{I}q(2)}{\Delta t} \end{bmatrix} \quad (25)$$

Supposing that n control cycles are included in the predetermined period, and supposing that, according thereto, the basic voltage matrix data is set by n items of data as shown by the Equation (26) below, and that the coefficient for modulation is termed s(k) (where k=1, 2, . . . , in time series number of the predetermined period), then the voltage for detection appears in the form of the Equation (27) below:

$$d\hat{h}dq = \{d\hat{h}dq(1), d\hat{h}dq(2), \cdots, d\hat{h}dq(n)\} \quad (26)$$

$$= \left\{ \begin{pmatrix} d\hat{h}d(1) \\ d\hat{h}q(1) \end{pmatrix}, \begin{pmatrix} d\hat{h}d(2) \\ d\hat{h}q(2) \end{pmatrix}, \cdots, \begin{pmatrix} d\hat{h}d(n) \\ d\hat{h}q(n) \end{pmatrix} \right\}$$

$$\hat{H}dq(i+k\cdot n) = \begin{bmatrix} \hat{H}d(i+k\cdot n) \\ \hat{H}q(i+k\cdot n) \end{bmatrix} \quad (27)$$

$$= \begin{bmatrix} \hat{H}d(i-1+k\cdot n) \\ \hat{H}q(i-1+k\cdot n) \end{bmatrix} + s(k) \begin{bmatrix} d\hat{h}d(i-1) \\ d\hat{h}q(i-1) \end{bmatrix}$$

$$= \hat{H}dq(i-1+k\cdot n) + s(k) d\hat{h}dq(i-1)$$

Here, Hdq$\hat{}$(x) is taken as the output level of the test voltage in the x-th control cycle from the start of superimposition of the test voltage, i is taken as the time series number of the control cycle for one period of the test voltage, (i=1, 2, . . . n), k is taken as the time series number of the period of the test voltage (k=1, 2, . . . ), Hd$\hat{}$(x) is taken as the d-axis component of the output level of the test voltage in the x-th control cycle from the start of superimposition of the test voltage, and q$\hat{}$(x) is taken as the q-axis component of the output level of the test voltage in the x-th control cycle from the start of superimposition of the test voltage.

On the other hand, with the brushless motor control apparatus of this preferred embodiment of the present invention, the d-axis feedback voltage (Vd_fb) is calculated, for example, according to the Equation (28) below, so that the deviation between the d-axis command electrical current (Id_c) and the d-axis actual electrical current (Id_s) is made small; and, in the same manner, the q-axis feedback voltage (Vq_fb) is calculated according to the Equation (29) below, so that the deviation between the q-axis command electrical current (Iq_c) and the q-axis actual electrical current (Iq_s) is made small.

$$Vd\_fb = Kp(Id\_c - Id\_s) + Ki \int (Id\_c - Id\_s) dt \quad (28)$$

$$Vq\_fb = Kp(Iq\_c - Iq\_s) + Ki \int (Iq\_c - Iq\_s) dt \quad (29)$$

In this case, when the difference voltage of the test voltage (Hdq) between the control cycles is obtained as in the Equation (30) below, by the feedback voltage limitation means setting the d-axis voltage and the q-axis voltage {Vd$\hat{}$(2), Vq$\hat{}$(2)} for the next control cycle by a calculation according to the following Equations (31) and (32), in the present control cycle, the direction of the voltage vector which has as its components the difference voltage (dVd_fb) of the d-axis feedback voltage in the present control cycle with respect to the d-axis voltage in the previous control cycle, and the difference voltage (dVq_fb) of the q-axis feedback voltage in the present control cycle with respect to the q-axis voltage in the previous control cycle, can be limited to the direction of the voltage vector which has as its components the difference voltage ($k_1$) of the d-axis test voltage and the difference voltage ($k_2$) of the q-axis test voltage from the previous control cycle.

$$\begin{bmatrix} k_1 \\ k_2 \end{bmatrix} = s(k) \begin{bmatrix} d\hat{h}d(i-1) \\ d\hat{h}q(i-1) \end{bmatrix} \quad (30)$$

$$dv = \frac{1}{\sqrt{k_1^2 + k_2^2}} [k_1 \ k_2] \begin{bmatrix} dVd\_fb \\ dVq\_fb \end{bmatrix} \quad (31)$$

$$= \frac{1}{\sqrt{k_1^2 + k_2^2}} [k_1 \ k_2] \begin{bmatrix} Vd\_fb - Vd\_old \\ Vq\_fb - Vq\_old \end{bmatrix}$$

Here, Vd_old is the d-axis voltage for the previous control cycle, while Vq_old is the q-axis voltage for the previous control cycle.

$$\begin{bmatrix} \hat{V}d(2) \\ \hat{V}q(2) \end{bmatrix} = \begin{bmatrix} \hat{V}d(1) \\ \hat{V}q(1) \end{bmatrix} + \begin{bmatrix} k_1 \\ k_2 \end{bmatrix} + \begin{bmatrix} \frac{k_1}{k_1^2 + k_2^2} dv \\ \frac{k_1}{k_1^2 + k_2^2} dv \end{bmatrix} \quad (32)$$

$$= \begin{bmatrix} \hat{V}d(1) \\ \hat{V}q(1) \end{bmatrix} + \left[ 1 + \frac{dv}{\sqrt{k_1^2 + k_2^2}} \right] \begin{bmatrix} k_1 \\ k_2 \end{bmatrix}$$

Due to this, when one of the above described Equations (24) and (25) is subtracted from the other, the following Equation (33) is obtained:

$$\begin{bmatrix} L_0 + L_1\cos2\theta e & L_1\sin2\theta e \\ L_1\sin2\theta e & L_0 - L_1\cos2\theta e \end{bmatrix} \begin{bmatrix} \hat{V}d(2) - \hat{V}d(1) \\ \hat{V}q(2) - \hat{V}q(1) \end{bmatrix} = \quad (33)$$

$$\begin{bmatrix} L_0 + L_1\cos2\theta e & L_1\sin2\theta e \\ L_1\sin2\theta e & L_0 - L_1\cos2\theta e \end{bmatrix} \left[1 + \frac{dv}{\sqrt{k_1^2 + k_2^2}}\right] \begin{bmatrix} k_1 \\ k_2 \end{bmatrix} =$$

$$\begin{bmatrix} L_0 + L_1\cos2\theta e & L_1\sin2\theta e \\ L_1\sin2\theta e & L_0 - L_1\cos2\theta e \end{bmatrix} \left[1 + \frac{dv}{\sqrt{k_1^2 + k_2^2}}\right] s(k) \begin{bmatrix} dhd(1) \\ dhq(1) \end{bmatrix} \equiv$$

$$\begin{bmatrix} L_0 + L_1\cos2\theta e & L_1\sin2\theta e \\ L_1\sin2\theta e & L_0 - L_1\cos2\theta e \end{bmatrix} s'(k) \begin{bmatrix} dhd(1) \\ dhq(1) \end{bmatrix} =$$

$$\begin{bmatrix} \frac{\Delta\hat{I}d(2) - \Delta\hat{I}d(1)}{\Delta t} \\ \frac{\Delta\hat{I}q(2) - \Delta\hat{I}q(1)}{\Delta t} \end{bmatrix} \equiv \begin{bmatrix} dd\hat{I}d(1) \\ dd\hat{I}q(1) \end{bmatrix} \equiv dd\hat{I}dq(1)$$

When the above described Equation (33) is transformed and the following Equation (34) is obtained, and the Equations (34) are summarized for each of the n control cycles within the predetermined period, the following Equation (35) is obtained:

$$dd\hat{I}dq(1) = \begin{bmatrix} L_0 + L_1\cos2\theta e & L_1\sin2\theta e \\ L_1\sin2\theta e & L_0 - L_1\cos2\theta e \end{bmatrix} s'(k) \begin{bmatrix} d\hat{h}d(1) \\ d\hat{h}q(1) \end{bmatrix} \quad (34)$$

$$= s'(k) \begin{bmatrix} d\hat{h}q(1) & d\hat{h}d(1) & d\hat{h}d(1) \\ d\hat{h}d(1) & d\hat{h}q(1) & d\hat{h}q(1) \end{bmatrix} \begin{bmatrix} L_1\sin2\theta e \\ L_1\cos2\theta e \\ L_0 \end{bmatrix}$$

$$= s'(k) \cdot \hat{c}(1) \begin{bmatrix} L_1\sin2\theta e \\ L_1\cos2\theta e \\ L_0 \end{bmatrix}$$

$$\begin{bmatrix} \hat{c}(1) \\ \hat{c}(2) \\ \vdots \\ \hat{c}(n) \end{bmatrix} \begin{bmatrix} L_1\sin2\theta e \\ L_1\cos2\theta e \\ L_0 \end{bmatrix} \equiv \hat{C} \begin{bmatrix} L_1\sin2\theta e \\ L_1\cos2\theta e \\ L_0 \end{bmatrix} \quad (35)$$

$$= \begin{bmatrix} \frac{1}{s'(k)} dd\hat{I}dq(1) \\ \frac{1}{s'(k)} dd\hat{I}dq(2) \\ \vdots \\ \frac{1}{s'(k)} dd\hat{I}dq(n) \end{bmatrix}$$

In the above described Equation (35), when n>1, the matrix C is a full rank matrix if there are two or more independent voltage vectors $\{dV(i), dV(j)$, where $1 \leq i \leq n$, $1 \leq j \leq n$, and $i \neq j\}$ which are not zero vectors, and the least square presumed value of the sine reference value (VŜ) corresponding to the sine value of twice the angle of the phase difference ($\theta e = \theta - \theta\hat{\,}$) between the actual value ($\theta$) and the presumed value ($\theta\hat{\,}$) of the rotor angle of the motor, and the cosine reference value (Vĉ) according to the cosine value of twice the angle of the phase difference ($\theta e$), may be calculated from the following Equation (36):

$$\begin{bmatrix} \hat{V}_S \\ \hat{V}_C \\ \hat{V}_l \end{bmatrix} = \begin{bmatrix} L_1\sin2\theta e \\ L_1\cos2\theta e \\ L_0 \end{bmatrix} \quad (36)$$

$$= (\hat{C}^t \hat{C})^{-1} \hat{C}^t \begin{bmatrix} \frac{1}{s'(k)} dd\hat{I}dq(1) \\ \frac{1}{s'(k)} dd\hat{I}dq(2) \\ \vdots \\ \frac{1}{s'(k)} dd\hat{I}dq(n) \end{bmatrix}$$

$$\equiv \hat{D} \begin{bmatrix} \frac{1}{s'(k)} dd\hat{I}dq(1) \\ \frac{1}{s'(k)} dd\hat{I}dq(2) \\ \vdots \\ \frac{1}{s'(k)} dd\hat{I}dq(n) \end{bmatrix}$$

The phase difference ($\theta e$) may be calculated from the sine reference value (VŜ) and the cosine reference value (Vĉ), and the actual value ($\theta = \theta\hat{\,} + \theta e$) of the rotor angle may be calculated, for example by the Equation (37) below:

$$\theta e = \frac{1}{2}\tan^{-1}\frac{\hat{V}_S}{\hat{V}_C} \quad (37)$$

Here, the matrix C is a function of the basic voltage matrix pattern, and, since its components are constant, it is possible to calculate the components of the matrix D̂ in the above described Equation (36) in advance. Furthermore, although the coefficients s'(k) in the above described Equation (36) are expressed as per the Equation (38) below, $\{(dHd(i))^2 + (dHq(i))^2\}^{1/2}$ may be calculated from the data of the basic voltage matrix pattern and the coefficient for modulation.

$$s'(k) = \left(1 + \frac{dv}{\sqrt{k_1^2 + k_2^2}}\right) s(k) \quad (38)$$

$$= \left(1 + \frac{dv}{\sqrt{(s(k) \cdot dhd(I))^2 + (s(k) \cdot dhq(i))^2}}\right) s(k)$$

$$\equiv s(k) + \frac{dv \cdot s(k)}{\sqrt{(dHd(i))^2 + (dHq(i))^2}}$$

Due to this, for each control cycle within the predetermined period, it is possible to calculate the rotor angle of the motor by performing an easy calculation using the second order difference (ddIdq̂) of the measured electrical current which is calculated from the amount of change of the electrical current as measured by the electrical current measurement means, the corrected values {s'(k)} of the coefficient for modulation {s(k)} based upon the d-axis feedback voltage and the q-axis feedback voltage which have been limited by the feedback voltage limitation means, and the components of the matrix D which have been calculated in advance.

Furthermore, by limiting the d-axis feedback voltage and the q-axis feedback voltage in this manner by the feedback voltage limitation means, it is possible, when superimposing the test voltage with the test voltage superimposition means, to suppress the occurrence of interference to the feedback control of the d-axis electrical current and the q-axis electrical current by the electrical current control means. Due to this, it becomes unnecessary to perform procedures in order to suppress interference by implementing a low pass filter in the electrical current feedback system, and, the beneficial result is obtained that there is no deterioration of the responsiveness of rotor angle measurement, as is the case when a low pass filter has been implemented.

-Overall Structure-

Figure 2:
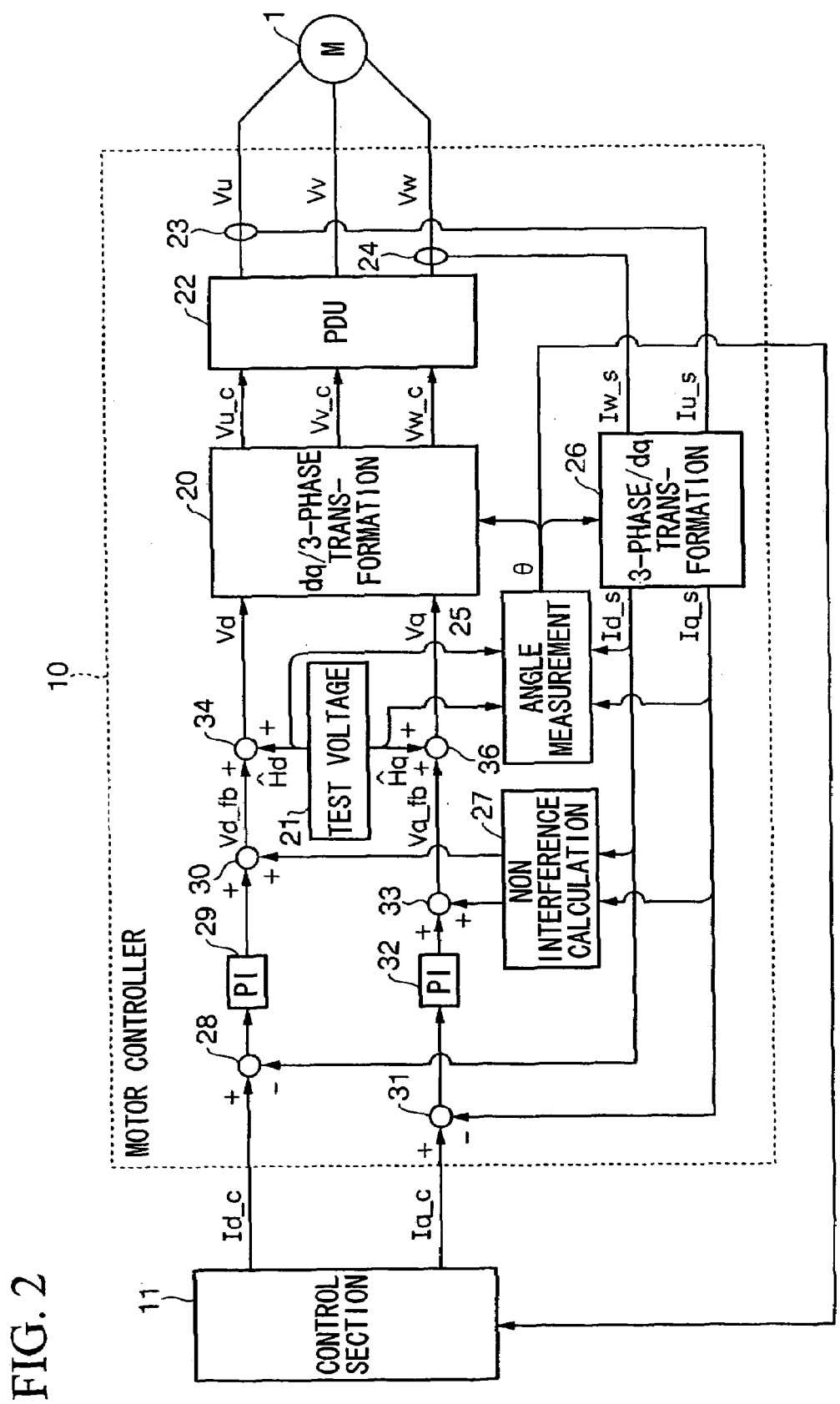
FIG. 2 is a block diagram showing the structure of this brushless motor control apparatus according to the preferred embodiment of the present invention.
Figure 3A:
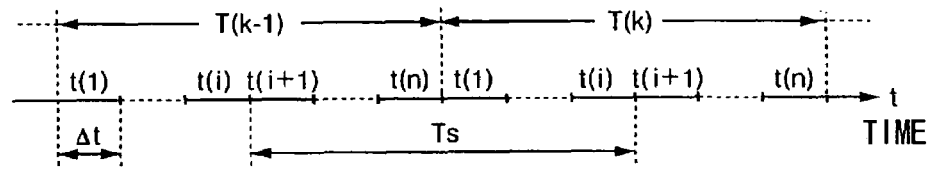
FIGS. 3A and 3B are figures showing, for this brushless motor control apparatus according to the preferred embodiment of the present invention, the period of the test voltage and the transition of the test voltage and the d-q axis electrical current.
Figure 3B:
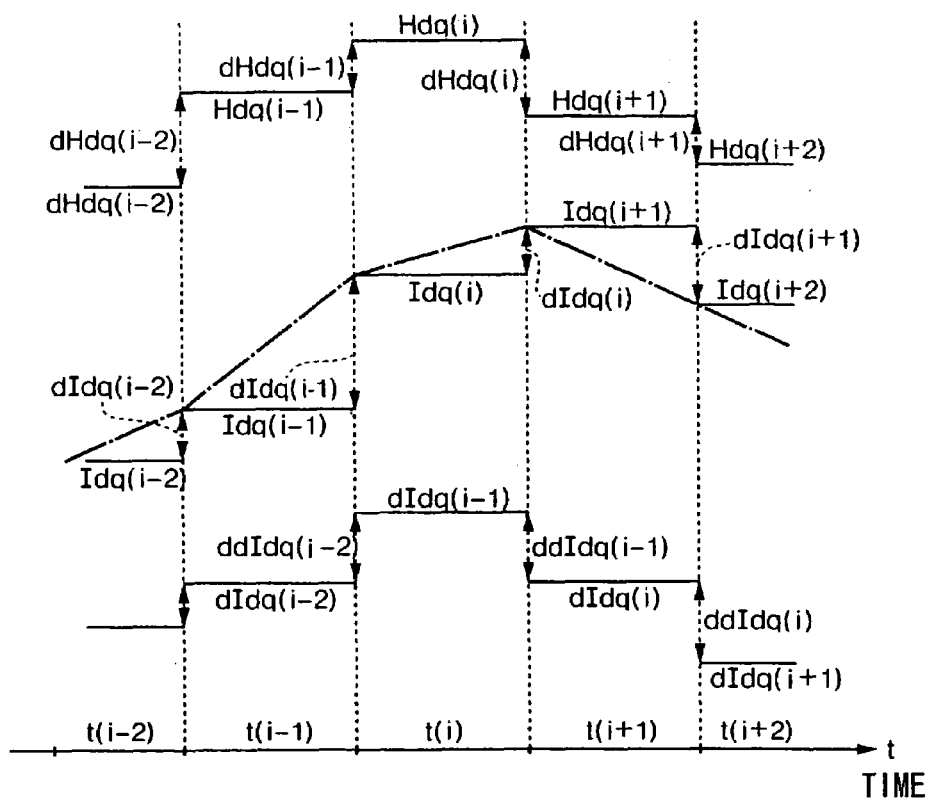

In the following, one example of a preferred embodiment of the present invention will be explained with reference to FIG. 1A to FIG. 3B. FIG. 2 is a block diagram showing the structure of the brushless motor control apparatus according to this preferred embodiment of the present invention. It should be understood that the brushless motor control apparatus of this preferred embodiment is useful for application to being mounted in a vehicle such as an EV (electric vehicle) or an HEV (Hybrid Electric Vehicle) or the like, and this explanation will be made, by way of example, in terms of this brushless motor control apparatus being mounted to an EV or to an HEV. Furthermore, FIGS. 3A and 3B are figures showing the period of the test voltage and the transition of the test voltage and the d-q-axis electrical current.

The motor controller 10 shown in FIG. 2 is a feedback circuit which performs feedback control of the electrical current which flows in armatures 3, 4, and 5 of a DC brushless motor 1 (hereinafter termed the motor 1) of the salient pole type shown in FIGS. 1A and 1B, and the motor 1 is dealt with by converting it to an equivalent circuit in a dq coordinate system, having a q-axis armature upon a q-axis which is the direction of the magnetic flux of the field poles of the rotor 2, and a d-axis armature upon a d-axis which is orthogonal to the q-axis.

Due to this, the motor controller 10 performs feedback control of the electrical current which flows in the d-axis armature (hereinafter termed the d-axis electrical current) and the electrical current which flows in the q-axis armature (hereinafter termed the q-axis electrical current), according to a d-axis command electrical current (Id_c) and a q-axis command electrical current (Iq_c) which are provided from the control section 11.

In concrete terms, the motor controller 10 includes a dq/3-phase transforming section 20 which converts the voltage which is applied to the d-axis armature (hereinafter termed the d-axis voltage (Vd)) and the voltage which is applied to the q-axis armature (hereinafter termed the q-axis voltage (Vq)) into command voltages for the drive voltages to be applied to the various three phases U, V, and W of the motor 1, a test voltage superimposition section 21 which generates test voltages (Hd^, Hq^), and a power drive unit 22 which includes an inverter circuit in which a plurality of switching elements are bridge connected so that drive voltages (Vu, Vv, and Vw) are respectively applied to the armatures for the various three phases U, V, and W of the motor 1 according to these command voltages (Vu_c, Vv_c, and Vw_c).

Furthermore, the motor controller 10 includes: a U-phase electrical current sensor 23 which measures the electrical current which is flowing through the armature for the U-phase of the motor 1, a W-phase electrical current sensor 24 which measures the electrical current which is flowing through the armature for the W-phase of the motor 1, a 3-phase/dq transforming section 26 which calculates a d-axis actual electrical current (Id_s) which is the measured value of the d-axis electrical current and a q-axis actual electrical current (Iq_s) which is the measured value of the q-axis electrical current based upon the measured electrical current value (Iu_s) of a U-phase electrical current sensor 23 and upon the measured electrical current value (Iw_s) of a W-phase electrical current sensor 24; an angular measurement section 25 which measures the rotor angle (θ) of the motor 1; and a non-interference calculation section 27 which performs processing to eliminate influence of speed electromotive force to cause mutual interference between the d-axis and the q-axis.

The motor controller 10 subtracts one of the d-axis command electrical current (Id_c) and the d-axis actual electrical current (Id_s) from the other with a first subtracter 28, performs proportional integration processing upon the result of this subtraction with a first PI calculation section 29, adds on a non-interference component with a first adder 30, and generates a d-axis feedback voltage (Vd_fb) according to the deviation between the d-axis command electrical current (Id_c) and the d-axis actual electrical current (Id_s). Furthermore, in the same manner, the motor controller 10 subtracts one of the q-axis command electrical current (Iq_c) and the q-axis actual electrical current (Iq_s) from the other with a second subtracter 31, performs proportional integration processing upon the result of this subtraction with a second PI calculation section 32, adds on a non-interference component with a second adder 33, and generates a q-axis feedback voltage (Vq_fb) according to the deviation between the q-axis command electrical current (Iq_c) and the q-axis actual electrical current (Iq_s).

With a third adder 34 and a fourth adder 36, the motor controller 10 adds a test voltage (Hd^) and a test voltage (Hq^) which will be described hereinafter to the d-axis feedback voltage (Vd_fb) and to the q-axis feedback voltage (Vq_fb) which have been generated in this manner, respectively, and inputs the results as the d-axis voltage (Vd) and the q-axis voltage (Vq) to the dq/3-phase transforming section 20. By doing this, via the power drive unit 22, a three phase voltage (Vu, Vv, Vw) which makes the deviation between the d-axis command electrical current (Id_c) and the d-axis actual electrical current (Id_s) and the deviation between the q-axis command electrical current (Iq_c) and the q-axis actual electrical current (Iq_s) small is applied to the armatures of the motor 1, and thereby the electrical currents which flow in the armatures of the motor 1 are feedback controlled.

When converting the d-axis voltage (Vd) and the q-axis voltage (Vq) into a three phase voltage command (Vu_c, Vv_c, Vw_c) by the dq/3-phase transforming section 20, then the rotor angle (θ) of the motor 1 becomes necessary. Furthermore, the rotor angle (θ) of the motor 1 also becomes necessary when converting the measured electrical current value (Iu_s) of the U-phase electrical current sensor 23 and the measured electrical current value (Iw_s) of the W-phase electrical current sensor 24 by the 3-phase/dq transforming section 26 into the d-axis actual electrical current (Id_s) and the q-axis actual electrical current (Iq_s).

Thus, when the test voltage (Hd^) has been superimposed by the test voltage superimposition section 21 upon the d-axis voltage (Vd_fb) with the third adder 34 and also the test voltage (Hq^) has been superimposed by the test voltage superimposition section 21 upon the q-axis voltage (Vq_fb) with the fourth adder 36, without utilizing any position measurement sensor such as a resolver or the like, the motor controller 10 measures the rotor angle (θ) of the motor 1 by utilizing the d-axis actual electrical current (Id_s^) and the q-axis actual electrical current (Iq_s^) which have been calculated by the 3-phase/dq transforming section 26 based upon the presumed value (θ^) of the rotor angle of the motor 1. Accordingly, as described above, the d-axis voltage (Vd) which consists of the d-axis voltage (Vd_fb) upon which the test voltage (Hd^) has been superimposed, and the q-axis voltage (Vq) which consists of the q-axis voltage (Vq_fb) upon which the test voltage (Hq^) has been superimposed, are inputted to the dq/3-phase transforming section 20.

-The Rotor Angle Measurement Procedure-

Next, the measurement procedure for the rotor angle (θ) by the motor controller 10 will be explained in detail. It should be understood that the initial value of the presumed value (θ^) of the rotor angle of the motor 1 is taken as "0". First, as shown in FIG. 3A, the test voltage superimposition section 21 generates a test voltage Hdq^ (Hd^, Hq^) which takes n periods of the control cycle (Δt) of the motor controller 10 as one period, according to the Equation (39) below:

$$\hat{H}dq(i+k\cdot n) = \begin{bmatrix} \hat{H}d(i+k\cdot n) \\ \hat{H}q(i+k\cdot n) \end{bmatrix} \quad (39)$$

$$= \begin{bmatrix} \hat{H}d(i-1+k\cdot n) \\ \hat{H}q(i-1+k\cdot n) \end{bmatrix} + s(k) \begin{bmatrix} d\hat{h}d(i-1) \\ d\hat{h}q(i-1) \end{bmatrix}$$

$$= \hat{H}dq(i-1+k\cdot n) + s(k)d\hat{h}dq(i-1)$$

Here, Hdq^(x) is the output level of the test voltage for the x-th control cycle from the start of superimposition of the test voltage, i is the number in time series of the control cycle for 1 period (i=1, 2, . . . . n), k is the number in time series of the period of the test voltage (k=1, 2, . . . n), Hd^(x) is the d-axis component of the output level of the test voltage for the x-th control cycle from the start of superimposition of the test voltage, Hq^(x) is the q-axis component of the output level of the test voltage for the x-th control cycle from the start of superimposition of the test voltage, s(k) is the value of the modulation signal (s) for the period of time series number k (equivalent to the coefficient for modulation of the present invention), dhdq^(x) is the basic voltage matrix data for the x-th control cycle from the start of superimposition of the test voltage, dhd^(x) is the d-axis component of the basic voltage matrix data for the x-th control cycle from the start of superimposition of the test voltage, and dhq^(x) is the q-axis component of the basic voltage matrix data for the x-th control cycle from the start of superimposition of the test voltage.

It should be understood that the data of the basic voltage matrix data [dhdq^={dhdq^(1), dhdq^(2), . . . (dhdq^(n)}] is stored in advance in a memory (not shown in the drawings). Furthermore, the data of the modulation signal (s) {s(1), s(2), . . . ) is also stored in advance in the memory; and it may also be generated by using a procedure such as an M series processing or the like which is often used in signal processing. Yet further, as shown in the Equation (40) below, the basic voltage matrix data [dhdq^={dhdq^(1), dhdq^(2), . . . (dhdq^(n)}] is set so that its average for one period becomes zero:

$$\sum_{m=1}^{n} d\hat{h}dq(m) = \sum_{m=1}^{n} \begin{bmatrix} d\hat{h}d(m) \\ d\hat{h}q(m) \end{bmatrix} = \begin{bmatrix} 0 \\ 0 \end{bmatrix} \quad (40)$$

In this case, as shown in the above described Equation (39), since the modulation signal (s) changes in each period of the test voltage (Hdq^), the average of the voltage level for one period (T) of the test voltage (Hdq^) is taken as being "0". Due to this, the levels of the d-axis voltage (Vd) and of the q-axis voltage (Vq) gradually become higher, and the exertion of influence upon the feedback control system of the armature electrical currents of the motor 1 is suppressed.

When the test voltages (Hd^, Hq^) have been superimposed by the test voltage superimposition section 21, in each control cycle {t(1) to t(n)}, the angular measurement section 25 measures the rotor angle of the motor 1 by utilizing the d-axis actual electrical current and the q-axis actual electrical current which are calculated by the 3-phase/dq transforming section 26 based upon the presumed value of the rotor angle of the motor 1.

Here, the second order difference of the d-axis electrical current and the second order difference of the q-axis actual electrical current in the control cycle t(i) of the k-th control cycle T(k) of the test voltages (Hd^, Hq^) are taken as being, respectively, "ddId^(i+k·n)" and "ddIq^(i+k·n)", as shown in Equation (41) below:

$$dd\hat{I}dq(i+k\cdot n) = \begin{bmatrix} dd\hat{I}d(i+k\cdot n) \\ dd\hat{I}q(i+k\cdot n) \end{bmatrix} \quad (41)$$

$$= \begin{bmatrix} \dfrac{\Delta \hat{I}d\_s(i+1+k\cdot n)}{\Delta t} - \dfrac{\Delta \hat{I}d\_s(i+k\cdot n)}{\Delta t} \\ \dfrac{\Delta \hat{I}q\_s(i+1+k\cdot n)}{\Delta t} - \dfrac{\Delta \hat{I}q\_s(i+k\cdot n)}{\Delta t} \end{bmatrix}$$

Furthermore, the amounts of change {dHd^(i+k·n), dHq(i+k·n)} for the control cycle t(i) of the k-th period T(k) of the test voltages (Hd^, Hq^), from the above described Equation (39), are given by the following Equations (42) and (43):

$$d\hat{H}d(i+k\cdot n) = \hat{H}d(i+k\cdot n) - \hat{H}d(i-1+k\cdot n) \quad (42)$$
$$= s(k)\cdot d\hat{h}d(i-1)$$

$$d\hat{H}q(i+k\cdot n) = \hat{H}q(i+k\cdot n) - \hat{H}q(i-1+k\cdot n) \quad (43)$$
$$= s(k)\cdot d\hat{h}q(i-1)$$

In order to limit the direction of the voltage vector which has as its components the difference voltage (dVd_fb) of the d-axis feedback voltage (Vd_fb) of the previous control cycle which is calculated by the first subtracter 28 and the first PI calculation section 29 according to the above described Equation (28) with respect to the d-axis voltage (Vd) and the difference voltage (dVq_fb) of the q-axis feedback voltage (Vq_fb) of the previous control cycle which is calculated by the second subtracter 31 and the second PI calculation section 32 according to the above described Equation (29) with respect to the q-axis voltage (Vq) to the direction of the voltage vector which has as its components the difference voltages of the test voltages {dHd^(i+k·n), dHq^(i+k·n)}, the third adder 34 and the fourth adder 36 output the d-axis voltage (Vd) and the q-axis voltage (Vq) which have been calculated by the calculations of the Equations (44) and (45) below to the dq/3-phase transforming section 20.

$$dv = \frac{1}{\sqrt{k_1^2 + k_2^2}} [k_1 \quad k_2] \begin{bmatrix} dV\_fb \\ dVq\_fb \end{bmatrix} \quad (44)$$

$$= \frac{1}{\sqrt{k_1^2 + k_2^2}} [k_1 \quad k_2] \begin{bmatrix} Vd\_fb - Vd\_old \\ Vq\_fb - Vq\_old \end{bmatrix}$$

Here, $k_1$ represents dHd^(i+k·n), $k_2$ represents dHd^(i+k·n) 1, Vd_old represents the d-axis voltage for the previous control cycle, and Vq_old represents the q-axis voltage for the previous control cycle.

$$\begin{bmatrix} Vd \\ Vq \end{bmatrix} = \begin{bmatrix} Vd\_old \\ Vq\_old \end{bmatrix} + \begin{bmatrix} k_1 \\ k_2 \end{bmatrix} + \begin{bmatrix} \frac{k_1}{\sqrt{k_1^2 + k_2^2}} dv \\ \frac{k_2}{\sqrt{k_1^2 + k_2^2}} dv \end{bmatrix} \quad (45)$$

$$= \begin{bmatrix} Vd\_old \\ Vq\_old \end{bmatrix} + \left[1 + \frac{dv}{\sqrt{k_1^2 + k_2^2}}\right] \begin{bmatrix} k_1 \\ k_2 \end{bmatrix}$$

Due to this, the matrix c^(i+k·n) which corresponds to the matrix c^(1) in the previously described Equation (34) is expressed by the following Equation (46):

$$\hat{c}(i + k \cdot n) = \begin{bmatrix} d\hat{h}q(i-1) & d\hat{h}d(i-1) & d\hat{h}d(i-1) \\ d\hat{h}d(i-1) & -d\hat{h}q(i-1) & d\hat{h}q(i-1) \end{bmatrix} \equiv \hat{c}(i) \quad (46)$$

When the previously described Equation (34) is summarized for Ts of FIG. 3A {the control cycle t(i) of the (k−1)th period T(k−1) to the control cycle t(i) of the k-th period T(k)}, it is possible to express it in the form of the Equation (47) below, and furthermore, by changing the form of Equation (47), it is possible to obtain the Equations (48) and (49) below:

$$\begin{bmatrix} \frac{dd\hat{I}dq(1+k\cdot n)}{\vdots} \\ \frac{dd\hat{I}dq(i+k\cdot n)}{} \\ \frac{dd\hat{I}dq(i+1+(k-1)\cdot n)}{} \\ \vdots \\ \frac{dd\hat{I}dq(n+(k-1)\cdot n)}{} \end{bmatrix} = \begin{bmatrix} s'(k)\hat{c}(1) \\ \vdots \\ s'(k)\hat{c}(i) \\ s'(k-1)\hat{c}(i+1) \\ \vdots \\ s'(k-1)\hat{c}(n) \end{bmatrix} \begin{bmatrix} L_1 \sin 2\theta e \\ L_1 \cos 2\theta e \\ L_0 \end{bmatrix} \quad (47)$$

$$\begin{bmatrix} \frac{dd\hat{I}dq(1+k\cdot n)}{s'(k)} \\ \vdots \\ \frac{dd\hat{I}dq(i+k\cdot n)}{s'(k)} \\ \frac{dd\hat{I}dq(i+1+(k-1)\cdot n)}{s'(k-1)} \\ \vdots \\ \frac{dd\hat{I}dq(n+(k-1)\cdot n)}{s'(k-1)} \end{bmatrix} = \begin{bmatrix} \hat{c}(1) \\ \vdots \\ \hat{c}(i) \\ \hat{c}(i+1) \\ \vdots \\ \hat{c}(n) \end{bmatrix} \begin{bmatrix} L_1 \sin 2\theta e \\ L_1 \cos 2\theta e \\ L_0 \end{bmatrix} \quad (48)$$

$$\equiv \hat{C} \begin{bmatrix} L_1 \sin 2\theta e \\ L_1 \cos 2\theta e \\ L_0 \end{bmatrix}$$

$$\begin{bmatrix} \hat{V}_S \\ \hat{V}_C \\ \hat{V}_I \end{bmatrix} = \begin{bmatrix} L_1 \sin 2\theta \\ L_1 \cos 2\theta \\ L_0 \end{bmatrix} = (\hat{C}^t \hat{C})^{-1} \hat{C}^t \begin{bmatrix} \frac{dd\hat{I}dq(1+k\cdot n)}{s'(k)} \\ \vdots \\ \frac{dd\hat{I}dq(i+k\cdot n)}{s'(k)} \\ \frac{dd\hat{I}dq(i+1+(k-1)\cdot n)}{s'(k-1)} \\ \vdots \\ \frac{dd\hat{I}dq(n+(k-1)\cdot n)}{s'(k-1)} \end{bmatrix} \quad (49)$$

$$\equiv \hat{D} \begin{bmatrix} \frac{dd\hat{I}dq(1+k\cdot n)}{s'(k)} \\ \vdots \\ \frac{dd\hat{I}dq(i+k\cdot n)}{s'(k)} \\ \frac{dd\hat{I}dq(i+1+(k-1)\cdot n)}{s'(k-1)} \\ \vdots \\ \frac{dd\hat{I}dq(n+(k-1)\cdot n)}{s'(k-1)} \end{bmatrix}$$

Here, FIG. 3B is a time series graph showing, for the control cycles t(i−2) to t(i+2), the transition between the test voltage (Hdq) and the measured electrical current (Idq). It is possible to calculate the second order difference {ddIdq^(i)} of the measured electrical current in the above described Equation (41) from the amount of change {dIdq(i)} of the measured electrical current in the control cycle interval t(i) and the amount of change {dIdq^(i+1)} of the measured electrical current in the control cycle interval t(i+1).

On the other hand, the components of the matrix c^(i) of the above described Equation (46) which are calculated according to the basic voltage matrix data (dhdq^) become constant. Accordingly, the components of the matrix C^ in the above described Equation (48) also become constant, and the components of the matrix D^ of the above described Equation (49) which is calculated based upon the matrix C also become constant. Due to this, the components of the matrix D^ of the above described Equation (49) can be calculated in advance from the basic voltage matrix data (dhdq^). Thus, the data for the components of the matrix D^ which has been calculated in this manner is stored in advance in the memory of the motor controller 10, and the angular measurement section 25 executes the calculation of the above described Equation (49) using the data for the components of the matrix D^ which has thus been stored in the memory.

In this case, the angular measurement section 25 is able to calculate the sine reference value (Vs^=L₁ sin(2θe)) and the cosine reference value (Vc^=L₁ cos(2θe)) according to twice the angular value of the phase difference (θe=θ−θ^) between the actual value (θ) and the presumed value (θ^) of the rotor angle by an easy calculation of the components of the matrix D^ and of s', which is the second order difference (ddIdq^) of the measured electrical current for each control interval and the modulation signal (s) corrected by the above described Equation (33). Due to this, it is possible to compress the time period for calculation of the sine reference value (Vs^) and the cosine reference value (Vc^).

Furthermore, if the direction of the voltage which has as its components the d-axis feedback voltage (Vd_fb) and the q-axis feedback voltage (Vq_fb) is limited to the vector direction of the voltage which has as its components the amounts of change of the test voltage {dHd^(i+k·n), dHq^(i+k·n)} in this manner, then it becomes unnecessary to provide any low pass filter to the electrical current feedback in order to reduce interference to the electrical current feedback system due to superimposition of the test voltage. Due to this, it is possible to maintain the responsiveness of the electrical current feedback system at a desirable level.

The angular measurement section 25 calculates the phase difference (θe) between the actual value (θ) and the presumed value (θ^) of the rotor angle of the motor 1 by the Equation (50) below, and measures the rotor angle (θ=θ^+θe).

$$\theta e = \frac{1}{2} \tan^{-1} \frac{\hat{V}s}{\hat{V}c} \quad (50)$$

Furthermore, by a following calculation of the observer according to the Equation (51) or the Equation (52) below, it is possible to correct the presumed value (θ^) of the rotor angle so as to converge the presumed error (θe) to zero, and thereby to measure the rotor angle.

$$\begin{pmatrix} \hat{\theta}(n+1) \\ \hat{\omega}(n+1) \end{pmatrix} = \begin{pmatrix} 1 & \Delta t \\ 0 & 1 \end{pmatrix} \begin{pmatrix} \hat{\theta}(n) \\ \hat{\omega}(n) \end{pmatrix} + \begin{pmatrix} K1 \\ K2 \end{pmatrix} \tilde{K} \frac{1}{2} \tan^{-1} \frac{\hat{V}s}{\hat{V}c} \quad (51)$$

$$= \begin{pmatrix} 1 & \Delta t \\ 0 & 1 \end{pmatrix} \begin{pmatrix} \hat{\theta}(n) \\ \hat{\omega}(n) \end{pmatrix} + \begin{pmatrix} K1 \\ K2 \end{pmatrix} \tilde{K}(\theta e(n) + \text{offset})$$

$$\begin{pmatrix} \hat{\theta}(n+1) \\ \hat{\omega}(n+1) \end{pmatrix} = \begin{pmatrix} 1 & \Delta t \\ 0 & 1 \end{pmatrix} \begin{pmatrix} \hat{\theta}(n) \\ \hat{\omega}(n) \end{pmatrix} + \begin{pmatrix} K1 \\ K2 \end{pmatrix} \tilde{K} \frac{\hat{V}s}{\sqrt{\hat{V}s^2 + \hat{V}c^2}} \quad (52)$$

$$\approx \begin{pmatrix} 1 & \Delta t \\ 0 & 1 \end{pmatrix} \begin{pmatrix} \hat{\theta}(n) \\ \hat{\omega}(n) \end{pmatrix} + \begin{pmatrix} K1 \\ K2 \end{pmatrix} \tilde{K}(\theta e(n) + \text{offset})$$

$$(\theta e(n) \approx 0)$$

Furthermore, by changing the offset value of the above described Equations (51) and (52), it is possible forcibly to shift the phase of the rotor angle which is measured, so that the measurement error can be minimized.

It should be understood that it would also be acceptable to approximate the calculation of $(Vs^{\wedge 2}+Vc^{\wedge 2})^{1/2}$ in the above described Equation (52), which takes quite a long period of time, by the following Equation (53):

$$\frac{\hat{V}s}{\sqrt{\hat{V}s^2 + \hat{V}c^2}} \approx \begin{cases} \frac{\hat{V}s}{|\hat{V}s|}(|\hat{V}s| > |\hat{V}c|\text{の場合}) \\ \frac{\hat{V}s}{|\hat{V}c|}(|\hat{V}c| > |\hat{V}s|\text{の場合}) \end{cases} \quad (53)$$

Furthermore although, in this preferred embodiment, according to the above described Equation (39), the test voltage superimposition section 21 calculates the test voltage {Hdq(i+k·n)} for the present control cycle by adding the product of the basic voltage matrix data {dhdq^(i−1)} and the modulation signal {s(k)} to the test voltage {Hdq(i−1+k·n)} for the previous control cycle, if the value of the modulation signal {s(k)} is set in advance, it is possible to calculate the test voltage (Hdq^) in advance, since the basic voltage matrix data is also known in advance.

In this case, it is possible to calculate the d-axis voltage (Vd) and the q-axis voltage (Vq) according to the following Equations (54) and (55):

$$Vd(i+k\cdot n) = \hat{H}d(i+k\cdot n) + Kp(Id\_c - Id\_s) + Ki\int(Id\_c - Id\_s)dt \quad (54)$$

$$= \hat{H}d(i+k\cdot n) + Vd\_fb$$

$$Vq(i+k\cdot n) = \hat{H}q(i+k\cdot n) + Kp(Iq\_c - Iq\_s) + Ki\int(Iq\_c - Iq\_s)dt \quad (55)$$

$$= \hat{H}q(i+k\cdot n) + Vq\_fb$$

According to the Equations (56) and (57) below, it is possible to limit the direction of the voltage vector whose components are the difference voltage (Vd(i+k·n)−Vd_old) of the d-axis voltage and the difference voltage (Vq(i+k·n)−Vq_old) of the q-axis voltage, which are respectively the differences between the values thereof in the present control cycle and in the previous control cycle, to the direction of the difference voltage ($k_1$, $k_2$) of the test voltage in the present control cycle with respect to its value in the previous control cycle.

$$\begin{pmatrix} k1 \\ k2 \end{pmatrix} = \begin{pmatrix} dHd(i+k \cdot n) \\ dHq(i+k \cdot n) \end{pmatrix} \quad (56)$$

$$dv = \frac{1}{\sqrt{k1^2 + k2^2}} (k1 \; k2) \begin{pmatrix} dVd \\ dVq \end{pmatrix} \quad (57)$$
$$= \frac{1}{\sqrt{k1^2 + k2^2}} (k1 \; k2) \begin{pmatrix} Vd(i+k \cdot n) - Vd\_old \\ Vq(i+k \cdot n) - Vq\_old \end{pmatrix}$$

Here, Vd_old is taken as being the d-axis voltage for the previous control cycle, and Vq_old is taken as being the q-axis voltage for the previous control cycle. Due to this, in this case, it is possible to limit the result of the electrical current feedback to the direction of the difference voltage ($k_1$, $k_2$) of the test voltages, by the third adder 34 and the fourth adder 36 calculating the d-axis voltage (Vd) and the q-axis voltage (Vq) according to the following Equation (58):

$$\begin{pmatrix} Vd \\ Vq \end{pmatrix} = \begin{pmatrix} Vd\_old \\ Vq\_old \end{pmatrix} + \begin{pmatrix} \frac{k1}{\sqrt{k1^2 + k2^2}} dv \\ \frac{k2}{\sqrt{k1^2 + k2^2}} dv \end{pmatrix} \quad (58)$$

-The Magnetic Pole Discrimination Procedure, and the Theory Thereof-

Here, since the variation of inductance which accompanies the rotation of the rotor 2 is a half period of the rotor angle θ, accordingly the calculated value of the rotor angle θ which is calculated by the above described procedure has the same values in both the electrical angle ranges of 0° to 180° and 180° to 360°. Accordingly, in order to measure the initial rotor angle θ when first starting the DC brushless motor 1 in the electrical angle range of 0° to 360°, it is necessary to execute the magnetic pole discrimination procedure for discriminating the orientation of the magnetic poles of the rotor 2 so as to determine in which of the electrical angle range of 0° to 180°, and the electrical angle range of 180° to 360°, the calculated value of the rotor angle θ is.

Thus first, before explaining the operation of the magnetic pole discrimination procedure, the basic concept of the procedure for magnetic pole discrimination will be explained. For example, when the rotor 2 is fixed in some position, and at this time an electrical current is flowed in the q-axis armature so that a magnetic field in the q-axis direction (the magnetic flux direction of the magnet of the rotor) is generated, it is considered that two phenomena may be engendered, as specified in the following:

(1) If "the orientation of the magnetic field which is generated by the electrical current=the orientation of the magnetic field which is generated by the magnet", then, since the magnetic field is in a state of saturation, the amount of fluctuation Δ1 of the self-inductance direct current component 1 of the three phases U, V, and W is relatively large.

(2) If "the orientation of the magnetic field which is generated by the electrical current≠the orientation of the magnetic field which is generated by the magnet", then, since the magnetic field is in a state of non-saturation, the amount of fluctuation Δ1 of the self-inductance direct current component 1 of the three phases U, V, and W is relatively small.

This phenomenon is the same if the rotor 2 is fixed in some position, and at this time an electrical current is flowed in the positive direction and in the negative direction of the q-axis armature, thus generating a magnetic field in the q-axis direction (the magnetic flux direction of the magnet of the rotor): (1) if "the orientation of the magnetic field which is generated by an electrical current in the positive direction=the orientation of the magnetic field which is generated by the magnet", then, since the magnetic field is in a state of saturation, the amount of fluctuation Δ1 of the self-inductance direct current component 1 of the three phases U, V, and W is relatively large; (2) if "the orientation of the magnetic field which is generated by an electrical current in the negative direction≠the orientation of the magnetic field which is generated by the magnet", then, since the magnetic field is in a state of non-saturation, the amount of fluctuation Δ1 of the self-inductance direct current component 1 of the three phases U, V, and W is relatively small.

Accordingly, by calculating the cosine reference value (Vc^), which is varied according to the value of the amount of fluctuation Δ1 of the self-inductance direct current component 1 of the three phases U, V, and W, and which is calculated according to the previously described Equation (36, from each of Δ1 based upon the electrical current in the positive direction and Δ1 based upon the electrical current in the negative direction, and by comparing together the respective magnitudes thereof, it is possible to decide upon which of the electrical angle regions 0° to 180°, and 180° to 360°, the rotor 2 is present in.

Figure 4:
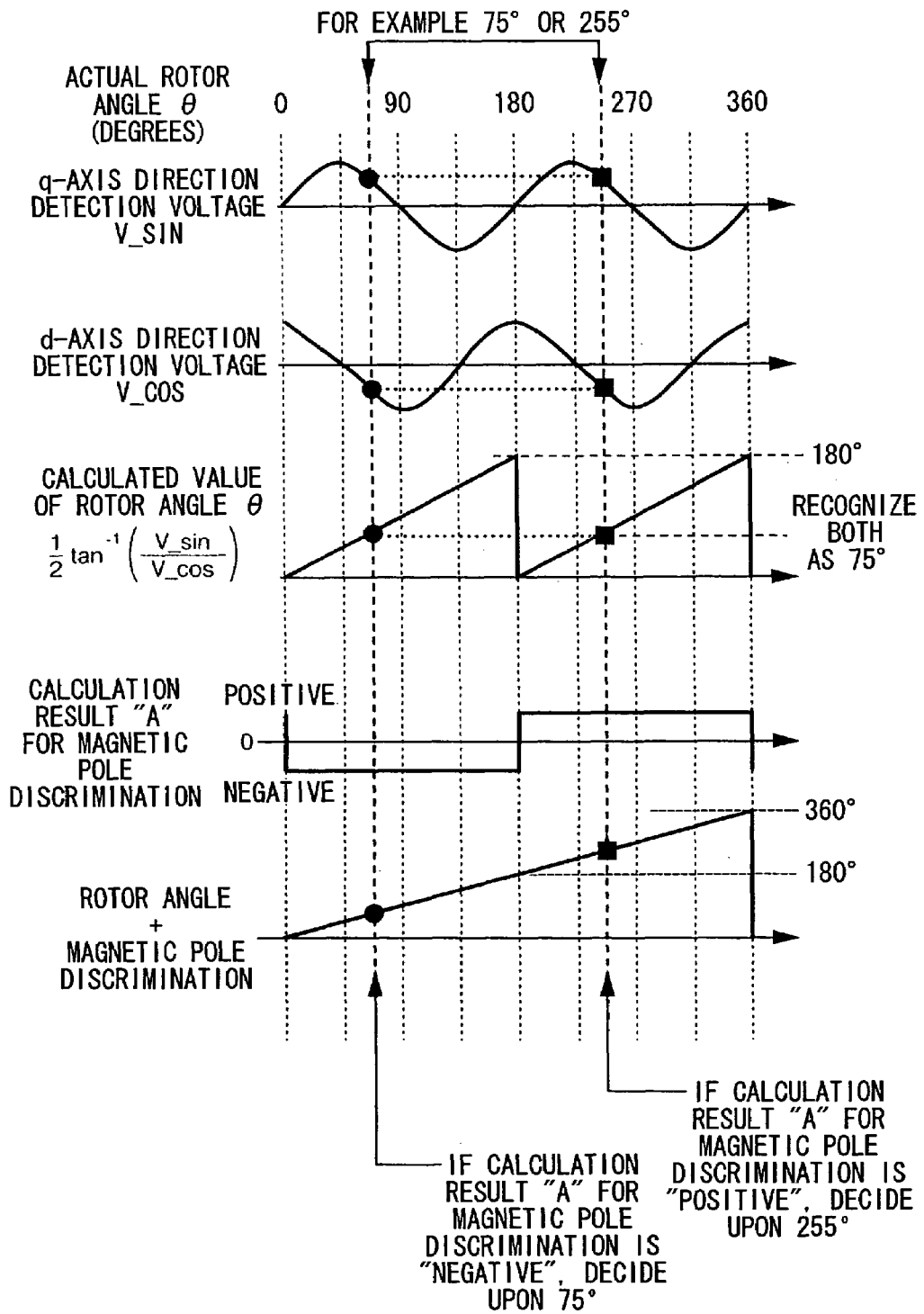
FIG. 4 is a figure showing, for this brushless motor control apparatus according to the preferred embodiment of the present invention, the relationship between the sign of a calculation result A for magnetic pole discrimination which has been calculated, and a calculated value for rotor angle θ.

In concrete terms, when for example the cosine reference value (Vc^) which is calculated from the Δ1 value based upon the electrical current in the positive direction is termed Vc1, and the cosine reference value (Vc^) which is calculated from the Δ1 value based upon the electrical current in the negative direction is termed Vc2, then, if the magnetic pole discrimination calculation result is defined as "A=Vc1−Vc2", it is possible to decide upon which of the electrical angle regions 0° to 180°, and 180° to 360°, the rotor 2 is present in, according as to whether the calculation result A for magnetic pole discrimination is positive or negative. For example, FIG. 4 is a figure showing the relationship between the sign of the calculation result A for magnetic pole discrimination and the calculated value of the rotor angle θ. As shown in FIG. 4, for example, whether the actual rotor angle θ=75° or the actual rotor angle θ=255°, since in both these cases a value for the rotor angle θ of 75° is calculated, the decision is made according to the positive or negative sign of the calculation result A for magnetic pole discrimination; for example, if the calculation result A for magnetic pole discrimination is negative, then it is decided that the rotor angle θ is equal to 75°, while, if the calculation result A for magnetic pole discrimination is positive, then it is decided that the rotor angle θ is equal to 255°.

Furthermore, if the time period which is required for the magnetic pole discrimination procedure is long, to a corresponding extent, it is not possible to perform accurate measurement of the position of the rotor 2; but, since the start of torque control of the motor 1 is slow, with the brushless motor control apparatus of this preferred embodiment of the present invention, when applying the field electrical current during execution of the magnetic pole discrimination procedure, by bringing the motor electrical current (the actual electrical current) close to the electrical current command value by electrical current feedback, in order to stabilize the peak value of the actual electrical current for a short time period, the procedure is executed with the integration for PI control of the previously described Equation (29) or (55) being omitted, so that the voltage command value is calculated only by proportional control (P).

Figure 5:
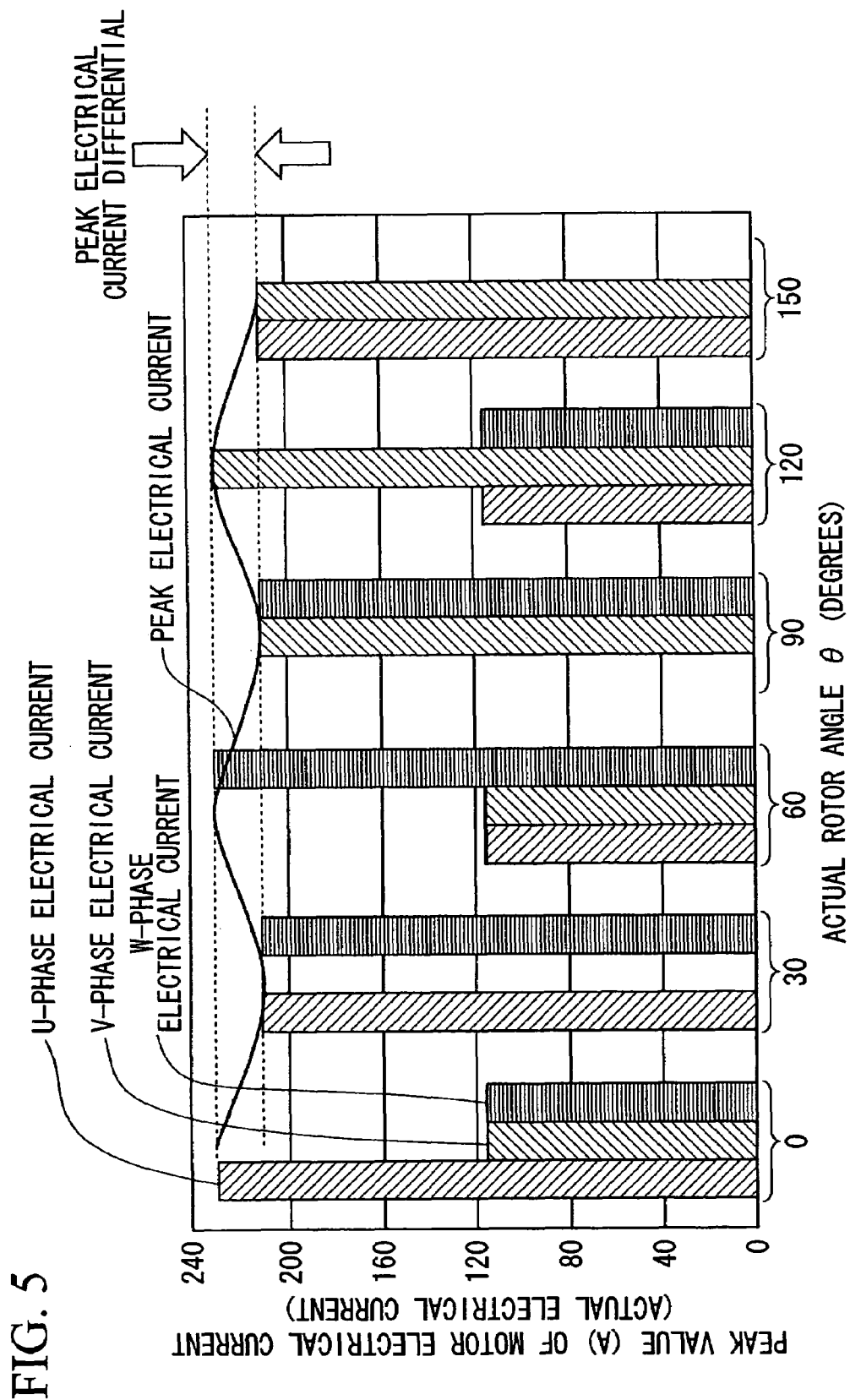
FIG. 5 is a figure for the brushless motor control apparatus of this preferred embodiment, showing in graph form, when calculation of a voltage command value for the field side is only performed by P (proportional) control, the peak value of motor electrical current (actual electrical current) with respect to the actual rotor angle θ.

However while it is possible, when performing the magnetic pole discrimination procedure for this type of brushless motor control apparatus, to stabilize the motor electrical current (the actual electrical current) over a short time period when starting the motor 1 and to compress the time period which is required for the magnetic pole discrimination procedure by calculating the voltage command value only by P (proportional) control, as shown in FIG. 5, since the peak value (the maximum value of the electrical current for each phase of the motor) of the motor electrical current (the actual electrical current) is not constant over the entire gamut of rotor angle, the phenomenon occurs that, also, the performance for magnetic pole discrimination, which is in a proportional relationship with the peak value of the motor electrical current (the actual electrical current), becomes non-constant over the entire gamut of rotor angle. Due to this, when performing control in accordance with the magnetic pole discrimination performance in areas where the peak value of the motor electrical current (the actual electrical current) is low, along with it being possible for the performance for magnetic pole discrimination to be too high in areas where the peak value of the motor electrical current (the actual electrical current) is high, the problem may arise that, due to the fact that the electrical current which is flowing is greater than that which is required, the efficiency of the motor is deteriorated, or that, again due to the fact that the electrical current which is flowing is greater than that which is required, the demagnetization operation of the motor becomes great so that the magnetic force of the permanent magnet which is provided in the rotor is reduced. It should be understood that FIG. 5 is a graph of the peak value of the motor electrical current (the actual electrical current) against the actual rotor angle θ, in the case in which the calculation of the voltage command value upon the field side is performed only be P (proportional) control.

Figure 6:
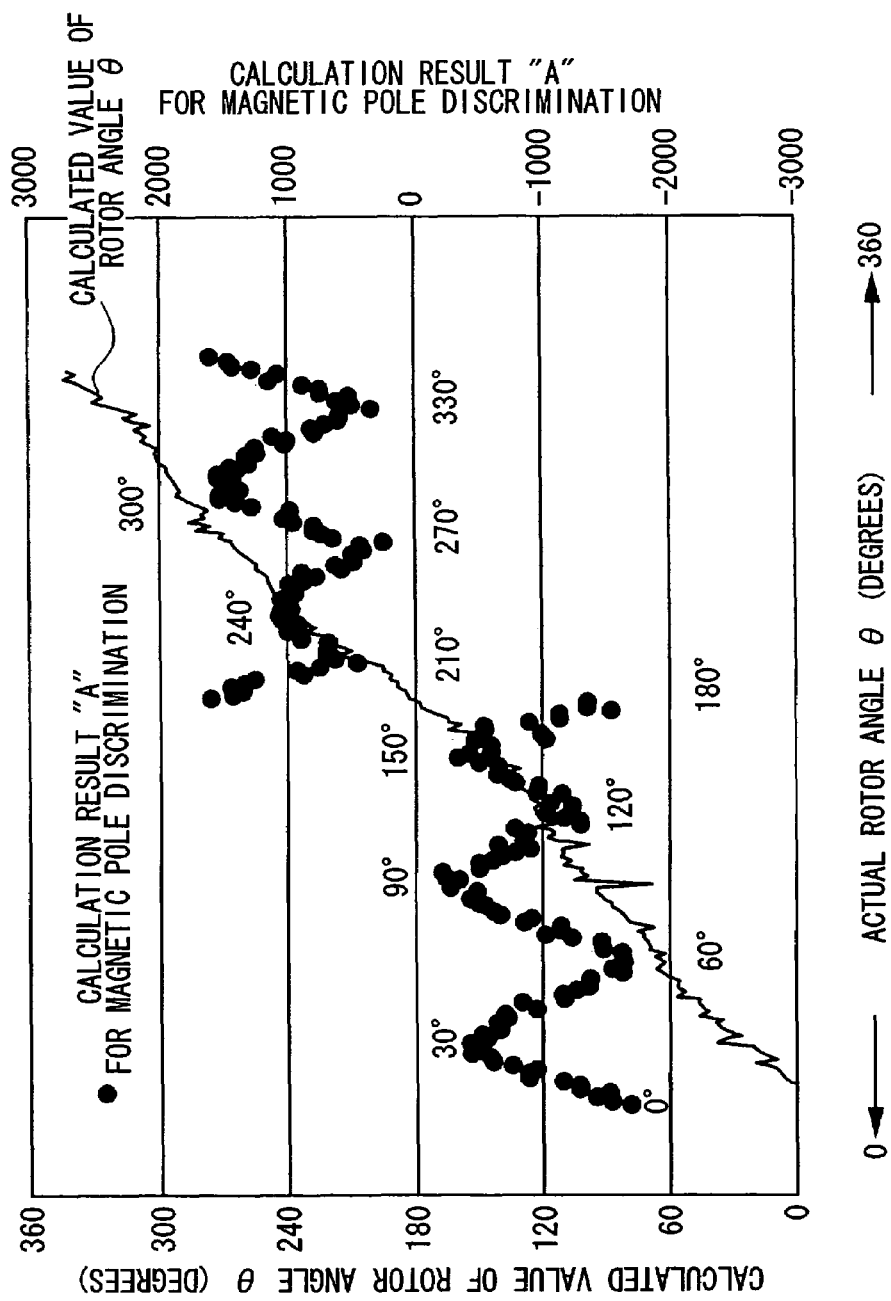
FIG. 6 is a figure for the brushless motor control apparatus of this preferred embodiment, showing in graph form, when calculation of a voltage command value for the field side is only performed by P (proportional) control, the calculated value of rotor angle θ with respect to the actual rotor angle θ, and the value of a calculation result A for magnetic pole discrimination with respect to the actual rotor angle θ.

In concrete terms, as shown in the graph of FIG. 6 which shows the calculated value of the rotor angle with respect to the actual rotor angle, and the value of the calculation result A for magnetic pole discrimination with respect to the actual rotor angle, the results were obtained that, when control is performed so that the calculation result A for magnetic pole discrimination has an exactly suitable value at the actual rotor angles of 30°, 90°, 150°, 210°, 270°, and 330° where the peak value of the motor electrical current (the actual electrical current) becomes small, then the value of the calculation result A for magnetic pole discrimination is too large at the actual rotor angles of 240° and 300° at which the peak value of the motor electrical current becomes large; while, at the actual rotor angles of 0°, 60°, and 120°, the value of the calculation result A for magnetic pole discrimination is too small (its absolute value is too big). It should be understood that FIG. 6 is a figure showing, in graphical form, the calculated value for the rotor angle θ with respect to the actual value of the rotor angle θ, and the value of the calculation result A for magnetic pole discrimination with respect to the calculated value of the rotor angle θ, when calculation of the voltage command value on the field side has been performed only by P (proportional) control.

-The Operation of the Magnetic Pole Discrimination Procedure-

Thus, with the brushless motor control apparatus of this preferred embodiment of the present invention, by calculating the voltage command value only by P (proportional) control, along with making the motor electrical current (the actual electrical current) when starting to operate the motor to be stable over a short time period, and shortening the time period required for the magnetic pole discrimination procedure, in order to avoid the above described problems and to execute the magnetic pole discrimination procedure with good efficiency, a plurality of electrical current command values are prepared in advance, and control is performed by changing over the q-axis command electrical current (Iq_c) (=the field electrical current command value) to one of these electrical current command values which have been prepared in advance, according to the calculated value of the rotor angle θ of the rotor 2 which has been calculated by the previously described "procedure for measurement of the rotor angle". Next, the operation of the magnetic pole discrimination procedure which is performed by the brushless motor control apparatus according to this preferred embodiment of the present invention will be explained in concrete terms with reference to the drawings.

-Changing Over of the q-Axis Command Electrical Current-

Figure 7:
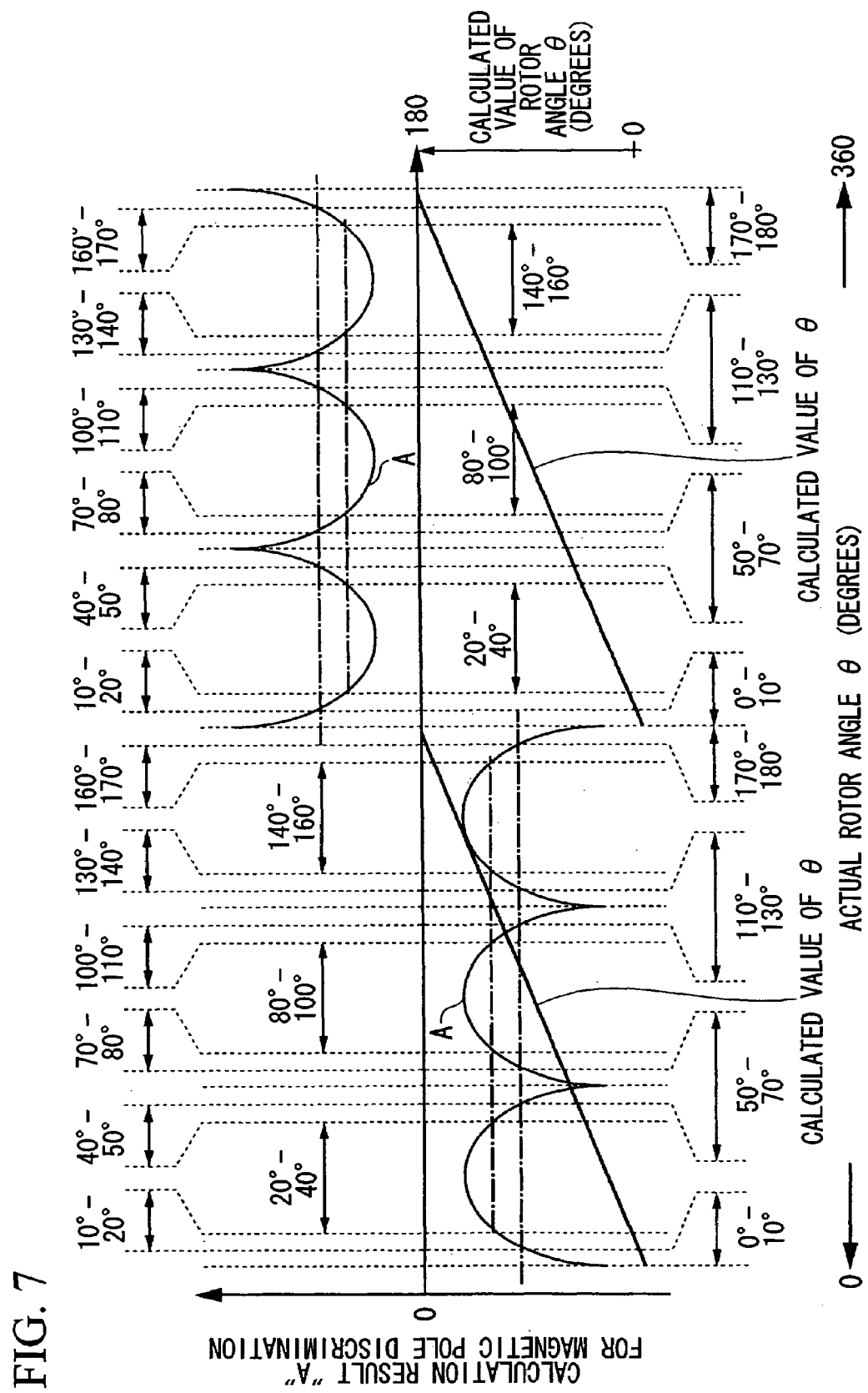
FIG. 7 is a figure for the brushless motor control apparatus of this preferred embodiment, showing the division into cases according to the value of the rotor angle θ, for controlling the changing over of the q-axis command electrical current (Iq_c) according to the calculated value of the rotor angle θ.

FIG. 7 is a figure showing the division of cases according to the value of the rotor angle θ for controlling the changing over of the q-axis command electrical current (Iq_c) according to the calculated value of the rotor angle θ of the rotor 2; one or another of the three electrical current command values "weak setting", "medium setting", or "strong setting" is designated for the q-axis command electrical current (Iq_c), according to the rotor angle θ which is finely divided into cases, according to its value. To explain this matter in detail, with the rotor angle θ in the ranges of 20° to 40°, 80° to 100°, and 140° to 160° in which the absolute value of the calculation result A for magnetic pole discrimination stabilizes at a small value, an electrical current command value of "strong setting", in which a large electrical current flows, is designated for the q-axis command electrical current (Iq_c). Furthermore, with the rotor angle θ in the ranges of 0° to 10°, 50° to 70°, 110° to 130°, and 170° to 180° in which the absolute value of the calculation result A for magnetic pole discrimination stabilizes at a large value, an electrical current command value of "weak setting", in which a small electrical current flows, is designated for the q-axis command electrical current (Iq_c).

Furthermore, with the rotor angle θ in the ranges of 10° to 20°, 40° to 50°, 70° to 80°, 100° to 110°, 130° to 140°, and 160° to 170° in which the absolute value of the calculation result A for magnetic pole discrimination varies between a small value and a large value, an electrical current command value of "medium setting", which is intermediate between the "strong setting" in which a large electrical current flows and the "weak setting" in which a small electrical current flows, is designated for the q-axis command electrical current (Iq_c). With regard to the magnitudes of the electrical currents which flow in the motor 1 for the three electrical current command values of "weak setting", "medium setting", and "strong setting", it should be understood that the assumption is that: the amount of electrical current which flows during the "strong setting">the amount of electrical current which flows during the "medium setting">the amount of electrical current which flows during the "weak setting".

-The Magnetic Pole Discrimination Processing Procedure-

Figure 8:
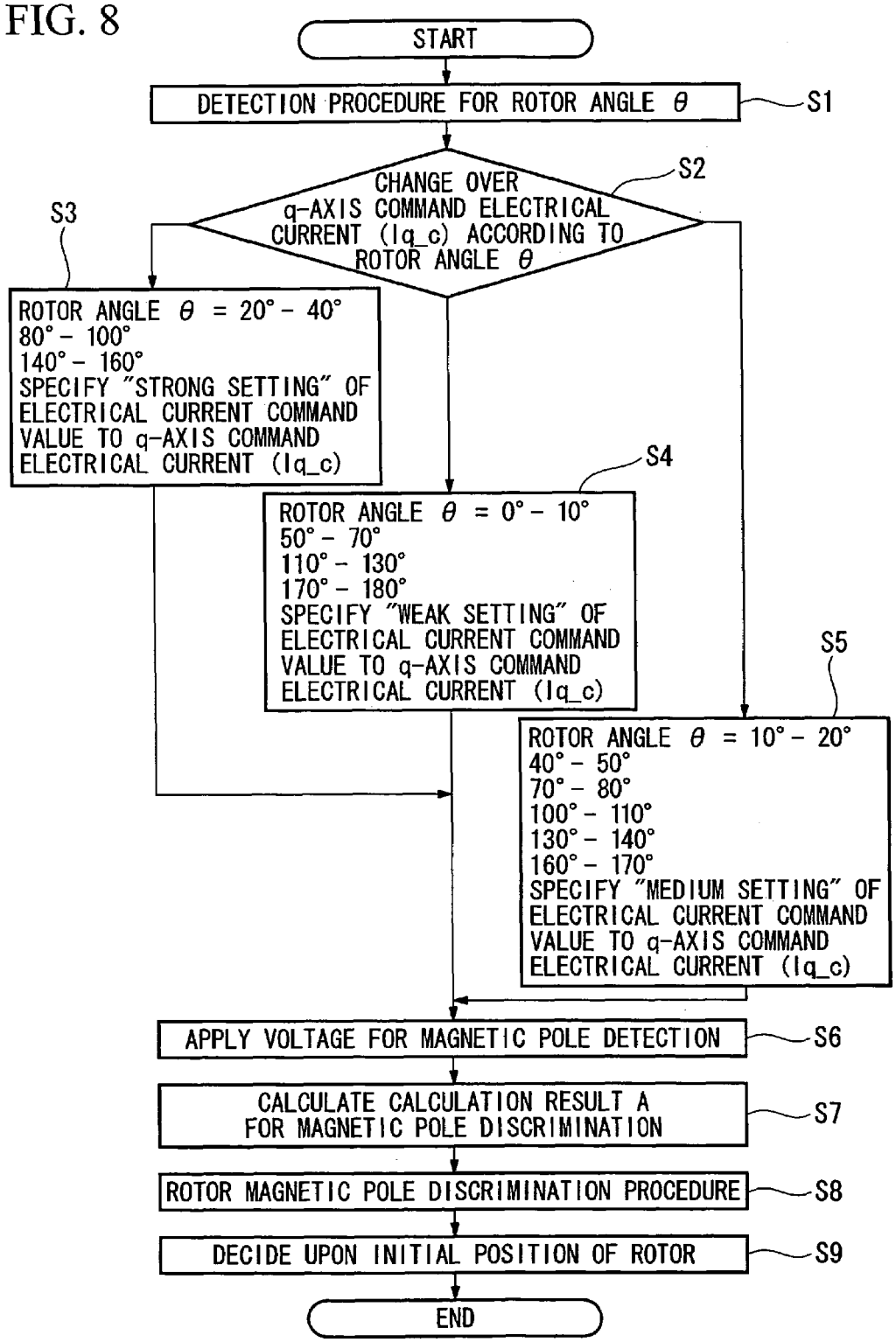
FIG. 8 is a flow chart showing the flow of a magnetic pole discrimination processing procedure of the brushless motor control apparatus of this preferred embodiment.

On the other hand, FIG. 8 is a flow chart showing the magnetic pole discrimination processing procedure which is performed by the brushless motor control apparatus of this preferred embodiment of the present invention. Referring to FIG. 8, first (in step S1), the angular measurement section 25 measures the rotor angle θ of the rotor 2 by the previously described "measurement procedure for the rotor angle".

Next (in step S2), the control section 11 changes over the q-axis command electrical current (Iq_c) according to the rotor angle θ, for the calculated value of the rotor angle θ which has been measured by the angular measurement section 25, based upon the correspondence relationship shown in FIG. 7 between the rotor angle θ and the plurality of electrical current command values which is stored in advance.

In concrete terms, if the rotor angle θ=20° to 40°, 80° to 200°, or 140° to 160°, then (in step S3) the electrical current command value is specified as being the "strong setting" of the q-axis command electrical current (Iq_c). If the rotor angle θ=0° to 10°, 50° to 70°, 110° to 130°, or 170° to 180°, then (in step S4) the electrical current command value is specified as being the "weak setting" of the q-axis command electrical current (Iq_c).

Furthermore, if the rotor angle θ=10° to 20°, 40° to 50°, 70° to 80°, 100° to 110°, 130° to 140°, or 160° to 170°, then (in step S5) the electrical current command value is specified as being the "medium setting" of the q-axis command electrical current (Iq_c).

By doing this, the motor controller 10, while performing feedback control of the electrical currents which are flowing in the armatures 3, 4, and 5 of the motor 1 in the dq coordinate system according to the d-axis command current (Id_c) and the q-axis command electrical current (Iq_c) which has been designated as any one of the above described "weak setting", "medium setting", and "strong setting" electrical current command values, also applies the voltage for magnetic pole detection to the voltage command value upon the field side with the test voltage superimposition section 21, and thereby flows (in step S6) an electrical current in the positive direction and an electrical current in the negative direction through the armatures 3, 4, and 5.

On the other hand, the angular measurement section 25 calculates (in step S7) the magnetic pole discrimination calculation result "A=Vc1−Vc2", by using the cosine reference value (Vĉ)=Vc1 which is calculated with the value Δ1 based upon the electrical current in the positive direction, and the cosine reference value (Vĉ)=Vc2 which is calculated with the value Δ1 based upon the electrical current in the negative direction, which are calculated based upon the previously described Equation (36).

Furthermore, as shown in FIG. 4, the angular measurement section 25 decides upon which of the electrical angle region of 0° to 180°, or the electrical angle region of 180° to 360°, the rotor 2 is present in, according to the plus or minus sign of the calculation result A for magnetic pole discrimination, and executes the magnetic pole discrimination procedure accordingly (in step S8).

Finally (in step S9) the angular measurement section 25 decides upon the initial position of the rotor 2, based upon the rotor angle θ which has been decided upon.

As has been explained above, according to the brushless motor control apparatus of this preferred embodiment of the present invention, when starting the motor 1, the motor controller 10, when converting the electrical current command value based upon the torque command value for the motor 1 to a voltage command value with the first PI calculation section 29 and the second PI calculation section 32, calculates the voltage command value only by P (proportional) control without executing any procedure of integration with the second PI calculation section 32, and thereby performs control so as to stabilize the motor electrical current (the actual electrical current) in a short time period. Furthermore, when in this state the angular measurement section 25 discriminates the orientation of the magnetic poles of the rotor 2 of the motor 1, the control section 11 changes the q-axis command electrical current (Iq_c) based upon the position of the rotor 2 of the motor 1. By doing this, the motor controller 10 is able to reduce the width of variation of the actual electrical current in the motor 1, while maintaining the performance for magnetic pole discrimination constant over the entire gamut of the rotor angle θ.

Figure 9:
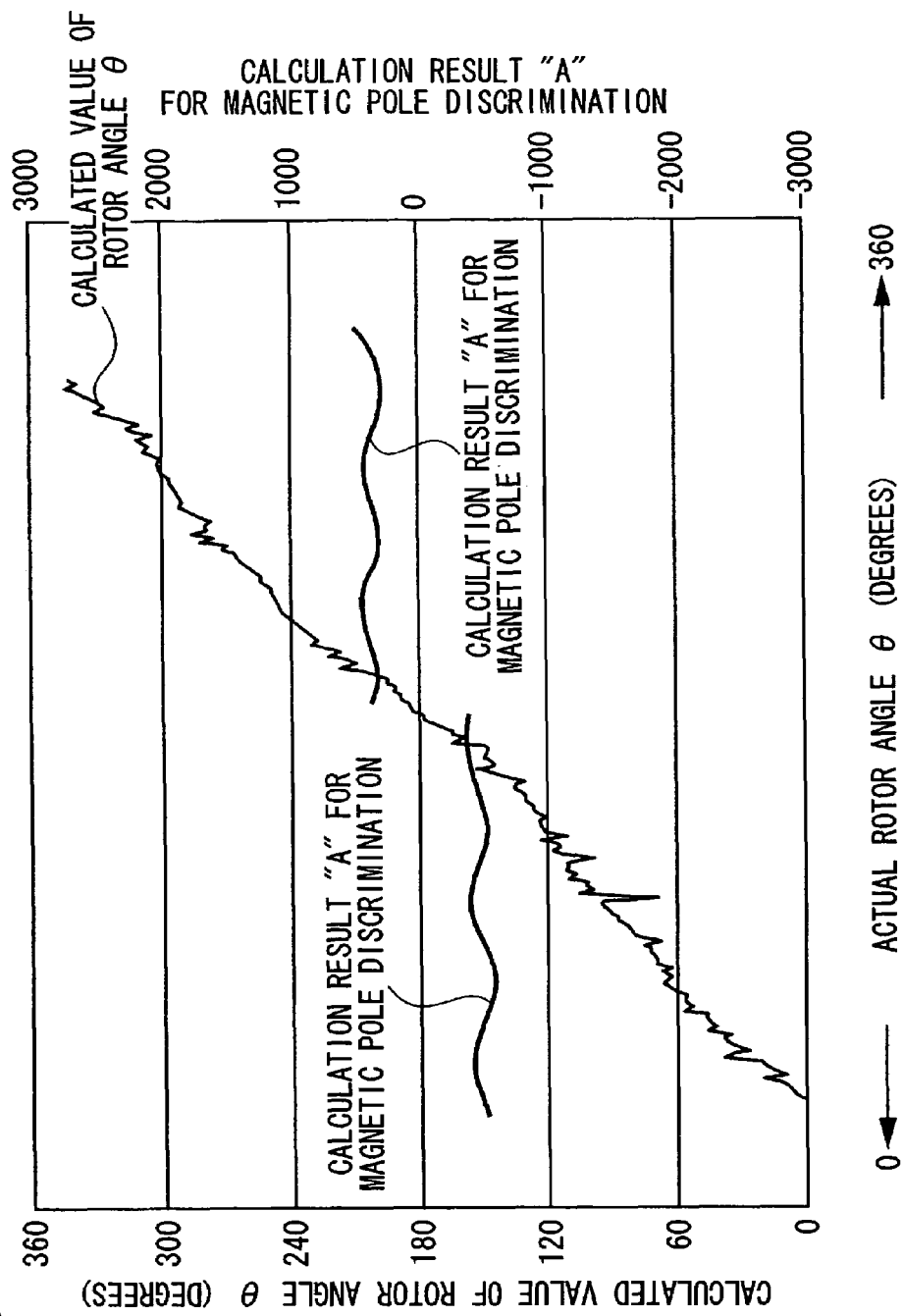
FIG. 9 is a figure for the brushless motor control apparatus of this preferred embodiment, showing in graph form the calculated value of rotor angle θ with respect to the actual rotor angle θ, and the value of a calculation result A for magnetic pole discrimination with respect to the actual rotor angle θ.

In concrete terms, by designating, according to the calculated value of the rotor angle θ which has been calculated by the above described "procedure of measuring the rotor angle", as the q-axis command electrical current (Iq_c), an electrical current command value of any one of the three steps large, medium, and small into which the electrical current which flows in the motor 1 has been divided from among a plurality of electrical current command values which have been set in advance for each of a predetermined set of angular ranges, the control section 11, while being able to reduce the width of variation of the actual electrical current in the motor 1 while maintaining the performance for magnetic pole discrimination stable over the entire gamut of the rotor angle θ, so as to exhibit the calculation result A for magnetic pole discrimination given in FIG. 9, is also able to reduce the width of variation of the performance for magnetic pole discrimination, which is in a proportional relationship with the peak value of the motor electrical current (the actual electrical current), over the entire gamut of the rotor angle. Accordingly the beneficial effect is obtained that it is possible to implement a brushless motor control apparatus which, when starting the motor, is capable of suppressing demagnetization by the magnetic pole discrimination procedure, executing the magnetic pole discrimination procedure in a short time period and moreover with good efficiency while ensuring a stabilized performance with regard to magnetic pole discrimination, and measuring the position of the rotor accurately. It should be understood that FIG. 9 is a figure showing, in graphical form, the calculated value of the rotor angle θ with respect to the actual rotor angle θ, and the calculation result A for magnetic pole discrimination with respect to the actual rotor angle θ, for the brushless motor control apparatus according to this preferred embodiment of the present invention.

Furthermore, by designating the q-axis command electrical current (Iq_c) by selecting an electrical current command value which corresponds to the rotor angle θ from among the electrical current command values which have been set in advance for each of the predetermined ranges of angles, it is possible to change the q-axis command electrical current (Iq_c) based upon the position of the rotor in an easy manner and moreover with a simple structure.

Accordingly the beneficial result is obtained that, over the entire gamut of the rotor angle θ, along with it being possible to stabilize the performance for magnetic pole discrimination, it is also possible to suppress the operation for demagnetization.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A brushless motor control apparatus of a brushless motor which comprises a permanent magnet type rotor and a stator, and which applies a harmonic voltage to a winding of the stator and measures the position of the rotor from the motor electrical current which is generated by the high frequency voltage, comprising:

an electrical current command control device which, in a magnetic pole discrimination procedure which discriminates the orientation of a magnetic pole of the rotor by applying field electrical current flowing in a direction of the magnetic field, varies a field electrical current command value based upon the position of the rotor, wherein the electrical current command control device is structured to select a field electrical current command value according to the rotor angle which specifies the position of the rotor from among a set of field electrical current command values which have been set in advance for each of a set of predetermined angular ranges.

2. A control method for a brushless motor which comprises a permanent magnet type rotor and a stator, comprising the steps of:

applying a harmonic voltage to a winding of the stator;

measuring the position of the rotor from the motor electrical current which is generated by the high frequency voltage;

varying a field electrical current command value based upon the position of the rotor along with discriminating the orientation of a magnetic pole of the rotor by applying field electrical current flowing in a direction of the magnetic field; and selecting a field electrical current command value according to the rotor angle which specifies the position of the rotor from among a set of field electrical current command values which have been set in advance for each of a set of predetermined angular ranges.

* * * * *